United States Patent
Zhang et al.

(10) Patent No.: US 10,869,342 B2
(45) Date of Patent: Dec. 15, 2020

(54) RADIO BEARER ESTABLISHMENT METHOD AND BASE STATION

(71) Applicant: HUAWEI TECHNOLOGIES CO., LTD., Shenzhen (CN)

(72) Inventors: Jian Zhang, Shanghai (CN); Mingzeng Dai, Shanghai (CN); Qinghai Zeng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 141 days.

(21) Appl. No.: 15/152,990

(22) Filed: May 12, 2016

(65) Prior Publication Data

US 2016/0262194 A1   Sep. 8, 2016

Related U.S. Application Data

(63) Continuation of application No. PCT/CN2013/087265, filed on Nov. 15, 2013.

(51) Int. Cl.
*H04W 4/00* (2018.01)
*H04W 76/10* (2018.01)
(Continued)

(52) U.S. Cl.
CPC ....... *H04W 76/10* (2018.02); *H04W 72/0413* (2013.01); *H04W 76/15* (2018.02); *H04W 16/32* (2013.01); *H04W 92/20* (2013.01)

(58) Field of Classification Search
CPC .................................................. H04W 76/025
See application file for complete search history.

(56) References Cited

U.S. PATENT DOCUMENTS 9,769,816 B2 *  9/2017  Kim ..................... H04L 5/001
9,788,358 B2 * 10/2017  Pelletier ............... H04W 76/15
(Continued)

FOREIGN PATENT DOCUMENTS

CN     102638899 A     8/2012
CN     103139911 A     6/2013
(Continued)

OTHER PUBLICATIONS

PCT International Search Report dated Jun. 13, 2014 in corresponding International Patent Application No. PCT/CN2013/087265.
(Continued)

*Primary Examiner* — Guang W Li
(74) *Attorney, Agent, or Firm* — Leydig, Voit & Mayer, Ltd.

(57) ABSTRACT

Embodiments of the present invention disclose a radio bearer establishment method and a base station and relate to the communications field. The method provided in the embodiments of the present invention includes: sending, by a first base station, first request information to a second base station, so that the second base station establishes a radio bearer between the second base station and user equipment UE according to the first request information, where the radio bearer includes a signaling radio bearer SRB, or a data radio bearer DRB, or an SRB and a DRB; and receiving, by the first base station, first response information sent by the second base station, where the first response information includes radio bearer establishment information that is used to indicate, to the first base station, a success or a failure to establish the radio bearer between the second base station and the user equipment UE.

12 Claims, 7 Drawing Sheets

(51) Int. Cl.
*H04W 76/15* (2018.01)
*H04W 72/04* (2009.01)
*H04W 92/20* (2009.01)
*H04W 16/32* (2009.01)

(56) References Cited

U.S. PATENT DOCUMENTS

| | | | | |
|---|---|---|---|---|
| 9,860,797 B2* | 1/2018 | Basu Mallick | ... | H04W 36/0027 |
| 10,039,086 B2* | 7/2018 | Baek | ...... | H04B 7/024 |
| 10,440,630 B2* | 10/2019 | Anninaka | ............ | H04W 72/04 |
| 2007/0041343 A1* | 2/2007 | Barreto | ................ | H04W 76/02 |
| | | | | 370/329 |
| 2010/0142367 A1* | 6/2010 | Zhang | ................. | H04W 36/02 |
| | | | | 370/216 |
| 2011/0085488 A1* | 4/2011 | Widegren | ........... | H04W 72/005 |
| | | | | 370/312 |
| 2012/0207078 A1* | 8/2012 | Hwang | ................ | H04W 80/02 |
| | | | | 370/315 |
| 2012/0263128 A1* | 10/2012 | Hu | ......................... | H04L 5/001 |
| | | | | 370/329 |
| 2013/0153298 A1* | 6/2013 | Pietraski | .................. | E21B 7/04 |
| | | | | 175/45 |
| 2014/0192775 A1* | 7/2014 | Li | ..................... | H04W 36/0072 |
| | | | | 370/331 |
| 2014/0219248 A1* | 8/2014 | Reddiboyana | ........ | H04W 76/15 |
| | | | | 370/331 |
| 2014/0269575 A1* | 9/2014 | Zhang | ................ | H04W 72/042 |
| | | | | 370/329 |
| 2014/0348128 A1* | 11/2014 | Tani | ....................... | H04B 7/155 |
| | | | | 370/331 |
| 2014/0355562 A1* | 12/2014 | Gao | ......................... | H04B 7/02 |
| | | | | 370/331 |
| 2015/0043435 A1* | 2/2015 | Blankenship | ........ | H04L 69/322 |
| | | | | 370/329 |
| 2015/0043490 A1* | 2/2015 | Wu | ......................... | H04W 8/26 |
| | | | | 370/329 |
| 2015/0043492 A1* | 2/2015 | Baek | .................... | H04W 76/15 |
| | | | | 370/329 |
| 2015/0124748 A1* | 5/2015 | Park | ...................... | H04L 5/0032 |
| | | | | 370/329 |
| 2015/0131578 A1* | 5/2015 | Baek | ....................... | H04B 7/024 |
| | | | | 370/329 |
| 2015/0173047 A1* | 6/2015 | Yamada | .............. | H04W 72/042 |
| | | | | 370/329 |
| 2015/0282238 A1* | 10/2015 | Aminaka | .............. | H04W 16/14 |
| | | | | 370/329 |
| 2015/0334551 A1* | 11/2015 | Aminaka | .............. | H04W 76/15 |
| | | | | 370/252 |
| 2016/0135174 A1* | 5/2016 | Lee | ........................ | H04W 76/10 |
| | | | | 370/329 |
| 2016/0198467 A1* | 7/2016 | Takahashi | ............... | H04L 5/001 |
| | | | | 370/329 |
| 2016/0212661 A1* | 7/2016 | Basu Mallick | ....... | H04L 1/1614 |
| 2016/0212662 A1* | 7/2016 | Lee | ........................ | H04W 76/34 |
| 2016/0249389 A1* | 8/2016 | Takahashi | ............. | H04L 5/0098 |
| 2019/0182881 A1* | 6/2019 | Teyeb | ................... | H04W 76/15 |

FOREIGN PATENT DOCUMENTS

| | | |
|---|---|---|
| JP | 2012-10111 A | 1/2012 |
| WO | 2012/122670 A1 | 9/2012 |
| WO | 2013155846 A1 | 10/2013 |

OTHER PUBLICATIONS

International Search Report dated Jun. 13, 2014, in corresponding International Application No. PCT/CN2013/087265.
"Discussion on RRC signalling via SeNB," 3GPP TSG-RAN2 Meeting #84, San Francisco, USA, R2-134005, pp. 1-3, 3rd Generation Partnership Project, Valbonne, France (Oct. 11-15, 2013).

* cited by examiner

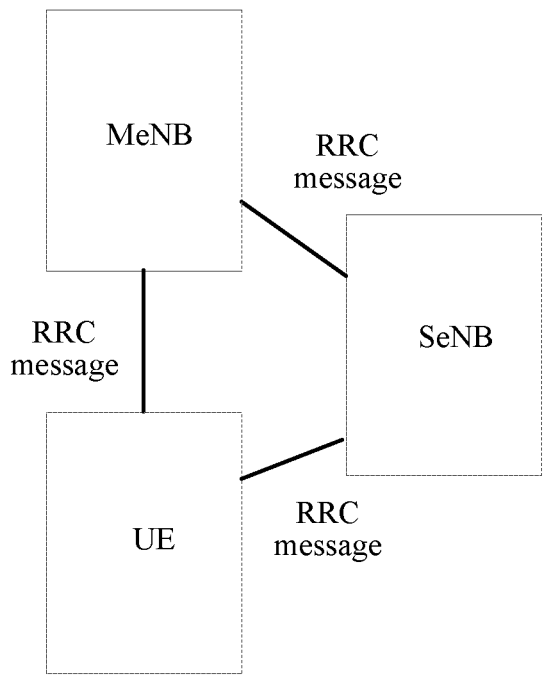

FIG. 1

```
A first base station sends first request information to a second
base station, so that the second base station establishes a radio
bearer between the second base station and user equipment UE
   according to the first request information, where the radio
   bearer includes an SRB, or a DRB, or an SRB and a DRB
```
— 201

```
The first base station receives first response information sent by
  the second base station, where the first response information
 includes radio bearer establishment information that is used to
     indicate, to the first base station, a success or a failure to
 establish the radio bearer between the second base station and
                     the user equipment UE
```
— 202

FIG. 2

RADIO BEARER ESTABLISHMENT METHOD AND BASE STATION

CROSS-REFERENCE TO RELATED APPLICATIONS

This application is a continuation of International Application No. PCT/CN2013/087265, filed on Nov. 15, 2013, both of which are hereby incorporated by reference in their entireties.

TECHNICAL FIELD

The present invention relates to the communications field, and in particular, to a radio bearer establishment method and a base station.

BACKGROUND

Long Term Evolution (long term evolution, LTE for short) technologies in the $3^{rd}$ Generation Partnership Project (the 3rd generation partnership project, 3GPP for short) include an evolved NodeB (evolved Node B, eNB for short) and an evolved packet core (evolved packet core, EPC for short). An access point of the EPC includes a mobility management entity (mobility management entity, MME for short) and a serving gateway (serving gateway, SGW for short). User equipment (user equipment, UE for short) accesses an LTE network by using a radio interface to the eNB. A macro base station and a micro base station both exist in a multi-site network, where the macro base station is corresponding to a macro cell, and the micro base station is corresponding to a small cell.

The inventor finds that in the prior art, an RRC message can be transmitted only by using a radio interface between a macro base station and UE, and transmission of the RRC message to the UE by using a small cell in a multi-site network is not implemented. Therefore, a communications system has a poor mobility management function, and mobility cannot be enhanced.

SUMMARY

Embodiments of the present invention provide a radio bearer establishment method and a base station. A radio bearer between a second base station and UE is established, and RRC information generated by a first base station can be forwarded by using the radio bearer between the second base station and the UE, so as to improve a mobility management function of a communications system and provide a mobility enhancement function.

To achieve the foregoing objective, the following technical solutions are adopted in the embodiments of the present invention:

According to a first aspect, the present invention provides a radio bearer establishment method, including:

sending, by a first base station, first request information to a second base station, so that the second base station establishes a radio bearer between the second base station and user equipment UE according to the first request information, where the radio bearer includes a signaling radio bearer (signaling radio bearer, SRB for short), or a data radio bearer (data radio bearer, DRB for short), or an SRB and a DRB; and receiving, by the first base station, first response information sent by the second base station, where the first response information includes radio bearer establishment information that is used to indicate, to the first base station, a success or a failure in establishing the radio bearer between the second base station and the user equipment UE.

With reference to the first aspect, in a first possible implementation manner of the first aspect, the first request information includes indication information that instructs the second base station to establish the radio bearer between the second base station and the UE; or the first request information includes a type and/or a priority of the radio bear that the second base station is instructed to establish between the second base station and the UE; or the first request information includes a type and/or a priority of the radio bear that the second base station is instructed to establish between the second base station and the UE, and information about a configuration parameter of the radio bearer.

With reference to the first aspect or the first possible implementation manner of the first aspect, in a second possible implementation manner of the first aspect, the first request information further includes a GPRS tunneling protocol (GPRS Tunnelling Protocol, GTP for short) tunnel endpoint identifier (Tunnel Endpoint ID, TEID for short) and information about a transport layer address that are of a radio bearer between the first base station and the UE, which are used to instruct the second base station to return a GTP TEID and information about a transport layer address that are of the radio bearer between the second base station and the UE; and correspondingly, the first response information includes the GTP TEID and the transport layer address that are of the radio bearer between the second base station and the UE.

With reference to the first aspect, or the first possible implementation manner of the first aspect, or the second possible implementation manner of the first aspect, in a third possible implementation manner of the first aspect, the sending, by a first base station, first request information to a second base station includes:

sending, by the first base station, a request message for establishing an interface between base stations to the second base station, where the request message for establishing an interface between base stations includes the first request information; and correspondingly, the receiving, by the first base station, first response information sent by the second base station includes:

receiving, by the first base station, a response message for establishing an interface between base stations that is sent by the second base station, where the response message for establishing an interface between base stations includes the first response information.

With reference to the third possible implementation manner of the first aspect, in a fourth possible implementation manner of the first aspect, the request information for establishing an interface between base stations further includes physical resource configuration information of the first base station and a cell radio network temporary identifier (Cell Radio Network Temporary Identifier, C-RNTI for short) of the UE, where the physical resource configuration information of the first base station includes at least one or more of the following information: identification information of the first base station, a physical cell identifier (Physical Cell ID, PCI for short) of a primary serving cell (Primary cell, PCell for short), E-UTRAN cell global identifier (E-UTRAN Cell Globle ID, ECGI for short) information of the PCell, and a PCI and an ECGI of zero to multiple secondary serving cells (Secondary cell, SCell for short).

With reference to the third possible implementation manner of the first aspect or the fourth possible implementation manner of the first aspect, in a fifth possible implementation manner of the first aspect, the response message for establishing an interface between base stations further includes physical resource configuration information of the second base station, or a C-RNTI allocated to the UE by the second base station, or physical resource configuration information of the second base station and a C-RNTI allocated to the UE by the second base station, where the physical resource configuration information of the second base station includes at least one or more of the following information: identification of the second base station, a PCI and ECGI information of one to multiple SCells, and PCI information of an SCell that is configured with a physical uplink control channel (Physical Uplink Control Channel, PUCCH for short).

With reference to the first aspect, or the first possible implementation manner of the first aspect, or the second possible implementation manner of the first aspect, in a sixth possible implementation manner of the first aspect, the sending, by a first base station, first request information to a second base station includes:

sending, by the first base station, configuration request information of the second base station to the second base station, where the configuration request information of the second base station includes the first request information; and correspondingly, the receiving, by the first base station, first response information sent by the second base station includes:

receiving, by the first base station, a configuration response message of the second base station that is sent by the second base station, where the configuration response message of the second base station includes the first response information.

With reference to the sixth possible implementation manner of the first aspect, in a seventh possible implementation manner of the first aspect, the configuration request information of the second base station further includes one or more of the following information: physical resource configuration information of the second base station, evolved radio access bearer (evolved radio access bearer, E-RAB for short) configuration information, and SRB configuration information.

With reference to the first aspect or any one of the first possible implementation manner of the first aspect to the seventh possible implementation manner of the first aspect, in an eighth possible implementation manner of the first aspect, the first response information further includes RRC configuration information of the second base station.

With reference to the first aspect or any one of the first possible implementation manner of the first aspect to the eighth possible implementation manner of the first aspect, in a ninth possible implementation manner of the first aspect, the method further includes:

sending, by the first base station, a packet including an RRC message to the second base station by using a GTP transport bearer that is between the first base station and the second base station and associates a radio bearer with another radio bearer, so that the second base station transmits the packet including the RRC message to the UE by using a corresponding SRB or DRB according to the packet.

With reference to the first aspect or any one of the first possible implementation manner of the first aspect to the ninth possible implementation manner of the first aspect, in a tenth possible implementation manner of the first aspect, the method further includes:

sending, by the first base station to the second base station by using a Stream Control Transmission Protocol (Stream Control Transmission Protocol, SCTP for short) transport bearer of an interface between base stations, second request information used for transmitting an RRC message, so that the second base station transmits the RRC message to the UE by using a corresponding SRB or DRB according to the second request information, where the second request information includes an information element of the RRC message.

According to a second aspect, the present invention provides a radio bearer establishment method, including:

receiving, by a second base station, first request information sent by a first base station, where the first request information is used to instruct the second base station to establish a radio bearer between the second base station and user equipment UE, and the radio bearer includes an SRB, or a DRB, or an SRB and a DRB;

establishing, by the second base station, the radio bearer between the second base station and the user equipment UE according to an instruction of the first request information; and sending, by the second base station, first response information to the first base station, where the first response information includes radio bearer establishment information that is used to indicate, to the first base station, a success or a failure to establish the radio bearer between the second base station and the user equipment UE.

With reference to the second aspect, in a first possible implementation manner of the second aspect, the first request information includes indication information that instructs the second base station to establish the radio bearer between the second base station and the UE; or the first request information includes a type and/or a priority of the radio bear that the second base station is instructed to establish between the second base station and the UE; or the first request information includes a type and/or a priority of the radio bear that the second base station is instructed to establish between the second base station and the UE, and information about a configuration parameter of the radio bearer; and correspondingly, the establishing, by the second base station, the radio bearer between the second base station and the user equipment UE according to an instruction of the first request information includes:

establishing, by the second base station, the radio bearer between the second base station and the user equipment UE according to a pre-agreement and the indication information that instructs the second base station to establish the radio bearer between the second base station and the UE and is included in the first request information; or establishing, by the second base station, the radio bearer between the second base station and the user equipment UE according to the type and/or the priority, of the radio bearer that the second base station is instructed to establish between the second base station and the UE, included in the first request information; or establishing, by the second base station, the radio bearer between the second base station and the user equipment UE according to the type and/or the priority of the radio bearer that the second base station is instructed to establish between the second base station and the UE, and the information about the configuration parameter of the radio bearer that are included in the first request information.

With reference to the second aspect or the first possible implementation manner of the second aspect, in a third possible implementation manner of the second aspect, the first request information further includes a GTP TEID and information about a transport layer address that are of a radio bearer between the first base station and the UE, which are used to instruct the second base station to return a GTP TEID and information about a transport layer address that are of the radio bearer between the second base station and the UE; and correspondingly, the first response message includes the GTP TEID and the transport layer address that are of the radio bearer between the second base station and the UE.

With reference to the second aspect, or the first possible implementation manner of the second aspect, or the second possible implementation manner of the second aspect, in a third possible implementation manner of the second aspect, the receiving, by a second base station, first request information sent by a first base station includes:

receiving, by the second base station, a request message for establishing an interface between base stations that is sent by the first base station, where the request message for establishing an interface between base stations includes the first request message; and correspondingly, the sending, by the second base station, first response information to the first base station includes:

sending, by the second base station, a response message for establishing an interface between base stations to the first base station, where the response message for establishing an interface between base stations includes the first response information.

With reference to the third possible implementation manner of the second aspect, in a fourth possible implementation manner of the second aspect, the request message for establishing an interface between base stations further includes physical resource configuration information of the first base station and a C-RNTI of the UE, where the physical resource configuration information of the first base station includes at least one or more of the following information: identification information of the first base station, a PCI of a PCell, ECGI information of the PCell, and a PCI and an ECGI of zero to multiple SCells.

With reference to the third possible implementation manner of the second aspect or the fourth possible implementation manner of the second aspect, in a fifth possible implementation manner of the second aspect, the response message for establishing an interface between base stations further includes physical resource configuration information of the second base station, or a C-RNTI allocated to the UE by the second base station, or physical resource configuration information of the second base station and a C-RNTI allocated to the UE by the second base station, where the physical resource configuration information of the second base station includes at least one or more of the following information: identification of the second base station, a PCI and ECGI information of one to multiple SCells, and PCI information of an SCell that is configured with a PUCCH.

With reference to the second aspect, or the first possible implementation manner of the second aspect, or the second possible implementation manner of the second aspect, in a sixth possible implementation manner of the second aspect, the receiving, by a second base station, first request information sent by a first base station includes:

receiving, by the second base station, a configuration request message of the second base station that is sent by the first base station, where the configuration request message of the second base station includes the first request message; and correspondingly, the sending, by the second base station, first response information to the first base station includes:

sending, by the second base station, a configuration response message of the second base station to the first base station, where the configuration response message of the second base station includes the first response information.

With reference to the sixth possible implementation manner of the second aspect, in a seventh possible implementation manner of the second aspect, the configuration request message of the second base station further includes one or more of the following information: physical resource configuration information of the second base station, E-RAB configuration information, and SRB configuration information.

With reference to the second aspect or any one of the first possible implementation manner of the second aspect to the seventh possible implementation manner of the second aspect, in an eighth possible implementation manner of the second aspect, the first response information further includes RRC configuration information of the second base station.

With reference to the second aspect or any one of the first possible implementation manner of the second aspect to the eighth possible implementation manner of the second aspect, in a ninth possible implementation manner of the second aspect, the method further includes:

receiving, by the second base station, a packet that includes an RRC message and is sent by the first base station by using a GTP transport bearer that is between the first base station and the second base station and associates a radio bearer with another radio bearer; and transmitting, by the second base station, the packet including the RRC message to the UE by using a corresponding SRB or DRB according to the packet.

With reference to the second aspect or any one of the first possible implementation manner of the second aspect to the ninth possible implementation manner of the second aspect, in a tenth possible implementation manner of the second aspect, the method further includes:

receiving, by the second base station, second request information that is used for transmitting an RRC message and sent to the second base station by the first base station by using an SCTP transport bearer of an interface between base stations; and transmitting, by the second base station, the RRC message to the UE by using a corresponding SRB or DRB according to the second request information, where the second request information includes an information element of the RRC message.

According to a third aspect, the present invention provides a first base station, including:

a sending unit, configured to send first request information to a second base station, so that the second base station establishes a radio bearer between the second base station and user equipment UE according to the first request information, where the radio bearer includes an SRB, or a DRB, or an SRB and a DRB; and a receiving unit, configured to receive first response information sent by the second base station, where the first response information includes radio bearer establishment information that is used to indicate, to the first base station, a success or a failure to establish the radio bearer between the second base station and the user equipment UE.

With reference to the third aspect, in a first possible implementation manner of the third aspect, the first request information includes indication information that instructs the second base station to establish the radio bearer between the second base station and the UE; or the first request information includes a type and/or a priority of the radio bear that the second base station is instructed to establish between the second base station and the UE; or the first request information includes a type and/or a priority of the radio bear that the second base station is instructed to establish between the second base station and the UE, and information about a configuration parameter of the radio bearer.

With reference to the third aspect or the first possible implementation manner of the third aspect, in a second possible implementation manner of the third aspect, the first request information further includes a GTP TEID and information about a transport layer address that are of a radio bearer between the first base station and the UE, which are used to instruct the second base station to return a GTP TEID and information about a transport layer address that are of the radio bearer between the second base station and the UE; and correspondingly, the first response information includes the GTP TEID and the transport layer address that are of the radio bearer between the second base station and the UE.

With reference to the third aspect, or the first possible implementation manner of the third aspect, or the second possible implementation manner of the third aspect, in a third possible implementation manner of the third aspect, the sending unit is specifically configured to:

send a request message for establishing an interface between base stations to the second base station, where the request message for establishing an interface between base stations includes the first request information; and correspondingly, the receiving unit is specifically configured to:

receive a response message for establishing an interface between base stations that is sent by the second base station, where the response message for establishing an interface between base stations includes the first response information.

With reference to the third possible implementation manner of the third aspect, in a fourth possible implementation manner of the third aspect, the request information for establishing an interface between base stations further includes physical resource configuration information of the first base station and a C-RNTI of the UE, where the physical resource configuration information of the first base station includes at least one or more of the following information: identification information of the first base station, a PCI of a PCell, ECGI information of the PCell, and a PCI and an ECGI of zero to multiple SCells.

With reference to the third possible implementation manner of the third aspect or the fourth possible implementation manner of the third aspect, in a fifth possible implementation manner of the third aspect, the response message for establishing an interface between base stations further includes physical resource configuration information of the second base station, or a C-RNTI allocated to the UE by the second base station, or physical resource configuration information of the second base station and a C-RNTI allocated to the UE by the second base station, where the physical resource configuration information of the second base station includes at least one or more of the following information: identification of the second base station, a PCI and ECGI information of one to multiple SCells, and PCI information of an SCell that is configured with a PUCCH.

With reference to the third aspect, or the first possible implementation manner of the third aspect, or the second possible implementation manner of the third aspect, in a sixth possible implementation manner of the third aspect, the sending unit is specifically configured to:

send configuration request information of the second base station to the second base station, where the configuration request information of the second base station includes the first request information; and correspondingly, the receiving unit is specifically configured to:

receive a configuration response message of the second base station that sent by the second base station, where the configuration response message of the second base station includes the first response information.

With reference to the sixth possible implementation manner of the third aspect, in a seventh possible implementation manner of the third aspect, the configuration request information of the second base station further includes one or more of the following information: physical resource configuration information of the second base station, E-RAB configuration information, and SRB configuration information.

With reference to the third aspect or any one of the first possible implementation manner of the third aspect to the seventh possible implementation manner of the third aspect, in an eighth possible implementation manner of the third aspect, the first response information further includes RRC configuration information of the second base station.

With reference to the third aspect or any one of the first possible implementation manner of the third aspect to the eighth possible implementation manner of the third aspect, in a ninth possible implementation manner of the third aspect, the sending unit is further configured to:

send a packet including an RRC message to the second base station by using a GTP transport bearer that is between the first base station and the second base station and associates a radio bearer with another radio bearer, so that the second base station transmits the packet including the RRC message to the UE by using a corresponding SRB or DRB according to the packet.

With reference to the third aspect or any one of the first possible implementation manner of the third aspect to the ninth possible implementation manner of the third aspect, in a tenth possible implementation manner of the third aspect, the sending unit is further configured to:

send, to the second base station by using an SCTP transport bearer of an interface between base stations, second request information used for transmitting an RRC message, so that the second base station transmits the RRC message to the UE by using a corresponding SRB or DRB according to the second request information, where the second request information includes an information element of the RRC message.

According to a fourth aspect, the present invention provides a second base station, including:

a receiving unit, configured to receive first request information sent by a first base station, where the first request information is used to instruct the second base station to establish a radio bearer between the second base station and user equipment UE, and the radio bearer includes an SRB, or a DRB, or an SRB and a DRB;

an establishing unit, configured to establish the radio bearer between the second base station and the user equipment UE according to an instruction of the first request information; and a sending unit, configured to send first response information to the first base station, where the first response information includes radio bearer establishment information that is used to indicate, to the first base station, a success or a failure to establish the radio bearer between the second base station and the user equipment UE.

With reference to the fourth aspect, in a first possible implementation manner of the fourth aspect, the first request information includes indication information that instructs the second base station to establish the radio bearer between the second base station and the UE; or the first request information includes a type and/or a priority of the radio bear that the second base station is instructed to establish between the second base station and the UE; or the first request information includes a type and/or a priority of the radio bear that the second base station is instructed to establish between the second base station and the UE, and information about a configuration parameter of the radio bearer; and correspondingly, the establishing unit is specifically configured to:

establish the radio bearer between the second base station and the user equipment UE according to a pre-agreement and the indication information that instructs the second base station to establish the radio bearer between the second base station and the UE and is included in the first request information; or establish the radio bearer between the second base station and the user equipment UE according to the type and/or the priority, of the radio bearer that the second base station is instructed to establish between the second base station and the UE, included in the first request information; or establish the radio bearer between the second base station and the user equipment UE according to the type and/or the priority of the radio bearer that the second base station is instructed to establish between the second base station and the UE, and the information about the configuration parameter of the radio bearer that are included in the first request information.

With reference to the fourth aspect or the first possible implementation manner of the fourth aspect, in a second possible implementation manner of the fourth aspect, the first request information further includes a GTP TEID and information about a transport layer address that are of a radio bearer between the first base station and the UE, which are used to instruct the second base station to return a GTP TEID and information about a transport layer address that are of the radio bearer between the second base station and the UE; and correspondingly, the first response message includes the GTP TEID and the transport layer address that are of the radio bearer between the second base station and the UE.

With reference to the fourth aspect, or the first possible implementation manner of the fourth aspect, or the second possible implementation manner of the fourth aspect, in a third possible implementation manner of the fourth aspect, the receiving unit is specifically configured to:

receive a request message for establishing an interface between base stations that is sent by the first base station, where the request message for establishing an interface between base stations includes the first request message; and correspondingly, the sending unit is specifically configured to:

send a response message for establishing an interface between base stations to the first base station, where the response message for establishing an interface between base stations includes the first response information.

With reference to the third possible implementation manner of the fourth aspect, in a fourth possible implementation manner of the fourth aspect, the request message for establishing an interface between base stations further includes physical resource configuration information of the first base station and a C-RNTI of the UE, where the physical resource configuration information of the first base station includes at least one or more of the following information: identification information of the first base station, a PCI of a PCell, ECGI information of the PCell, and a PCI and an ECGI of zero to multiple SCells.

With reference to the third possible implementation manner of the fourth aspect or the fourth possible implementation manner of the fourth aspect, in a fifth possible implementation manner of the fourth aspect, the response message for establishing an interface between base stations further includes physical resource configuration information of the second base station, or a C-RNTI allocated to the UE by the second base station, or physical resource configuration information of the second base station and a C-RNTI allocated to the UE by the second base station, where the physical resource configuration information of the second base station includes at least one or more of the following information: identification of the second base station, a PCI and ECGI information of one to multiple SCells, and PCI information of an SCell that is configured with a PUCCH.

With reference to the fourth aspect, or the first possible implementation manner of the fourth aspect, or the second possible implementation manner of the fourth aspect, in a sixth possible implementation manner of the fourth aspect, the receiving unit is specifically configured to:

receive a configuration request message of the second base station that is sent by the first base station, where the configuration request message of the second base station includes the first request message; and correspondingly, the sending unit is specifically configured to:

send a configuration response message of the second base station to the first base station, where the configuration response message of the second base station includes the first response information.

With reference to the sixth possible implementation manner of the fourth aspect, in a seventh possible implementation manner of the fourth aspect, the configuration request message of the second base station further includes one or more of the following information: physical resource configuration information of the second base station, E-RAB configuration information, and SRB configuration information.

With reference to the fourth aspect or any one of the first possible implementation manner of the fourth aspect to the seventh possible implementation manner of the fourth aspect, in an eighth possible implementation manner of the fourth aspect, the first response information further includes RRC configuration information of the second base station.

With reference to the fourth aspect or any one of the first possible implementation manner of the fourth aspect to the eighth possible implementation manner of the fourth aspect, in a ninth possible implementation manner of the fourth aspect, the receiving unit is specifically configured to:

receive, by the second base station, a packet that includes an RRC message and is sent by the first base station by using a GTP transport bearer that is between the first base station and the second base station and associates a radio bearer with another radio bearer; and the second base station further includes: a transmission unit, configured to transmit the packet including the RRC message to the UE by using a corresponding SRB or DRB according to the packet.

With reference to the fourth aspect or any one of the first possible implementation manner of the fourth aspect to the ninth possible implementation manner of the fourth aspect, in a tenth possible implementation manner of the fourth aspect, the receiving unit is specifically configured to:

receive second request information that is used for transmitting an RRC message and sent to the second base station by the first base station by using an SCTP transport bearer of an interface between base stations; and the transmission unit is further configured to transmit the RRC message to the UE by using a corresponding SRB or DRB according to the second request information, where the second request information includes an information element of the RRC message.

According to a fifth aspect, the present invention provides a first base station, including:

a sender, configured to send first request information to a second base station, so that the second base station establishes a radio bearer between the second base station and user equipment UE according to the first request information, where the radio bearer includes an SRB, or a DRB, or an SRB and a DRB; and a receiver, configured to receive first response information sent by the second base station, where the first response information includes radio bearer establishment information that is used to indicate, to the first base station, a success or a failure to establish the radio bearer between the second base station and the user equipment UE.

With reference to the fifth aspect, in a first possible implementation manner of the fifth aspect, the first request information includes indication information that instructs the second base station to establish the radio bearer between the second base station and the UE; or the first request information includes a type and/or a priority of the radio bear that the second base station is instructed to establish between the second base station and the UE; or the first request information includes a type and/or a priority of the radio bear that the second base station is instructed to establish between the second base station and the UE, and information about a configuration parameter of the radio bearer.

With reference to the fifth aspect or the first possible implementation manner of the fifth aspect, in a second possible implementation manner of the fifth aspect, the first request information further includes a GTP TEID and information about a transport layer address that are of a radio bearer between the first base station and the UE, which are used to instruct the second base station to return a GTP TEID and information about a transport layer address that are of the radio bearer between the second base station and the UE; and correspondingly, the first response information includes the GTP TEID and the transport layer address that are of the radio bearer between the second base station and the UE.

With reference to the fifth aspect, or the first possible implementation manner of the fifth aspect, or the second possible implementation manner of the fifth aspect, in a third possible implementation manner of the fifth aspect, the sender is specifically configured to:

send a request message for establishing an interface between base stations to the second base station, where the request message for establishing an interface between base stations includes the first request information; and correspondingly, the receiver is specifically configured to:

receive a response message for establishing an interface between base stations that is sent by the second base station, where the response message for establishing an interface between base stations includes the first response information.

With reference to the third possible implementation manner of the fifth aspect, in a fourth possible implementation manner of the fifth aspect, the request information for establishing an interface between base stations further includes physical resource configuration information of the first base station and a C-RNTI of the UE, where the physical resource configuration information of the first base station includes at least one or more of the following information: identification information of the first base station, a PCI of a PCell, ECGI information of the PCell, and a PCI and an ECGI of zero to multiple SCells.

With reference to the third possible implementation manner of the fifth aspect or the fourth possible implementation manner of the fifth aspect, in a fifth possible implementation manner of the fifth aspect, the response message for establishing an interface between base stations further includes physical resource configuration information of the second base station, or a C-RNTI allocated to the UE by the second base station, or physical resource configuration information of the second base station and a C-RNTI allocated to the UE by the second base station, where the physical resource configuration information of the second base station includes at least one or more of the following information: identification of the second base station, a PCI and ECGI information of one to multiple SCells, and PCI information of an SCell that is configured with a PUCCH.

With reference to the fifth aspect, or the first possible implementation manner of the fifth aspect, or the second possible implementation manner of the fifth aspect, in a sixth possible implementation manner of the fifth aspect, the sender is specifically configured to:

send configuration request information of the second base station to the second base station, where the configuration request information of the second base station includes the first request information; and correspondingly, the receiver is specifically configured to:

receive a configuration response message of the second base station that is sent by the second base station, where the configuration response message of the second base station includes the first response information.

With reference to the sixth possible implementation manner of the fifth aspect, in a seventh possible implementation manner of the fifth aspect, the configuration request information of the second base station further includes one or more of the following information: physical resource configuration information of the second base station, E-RAB configuration information, and SRB configuration information.

With reference to the fifth aspect or any one of the first possible implementation manner of the fifth aspect to the seventh possible implementation manner of the fifth aspect, in an eighth possible implementation manner of the fifth aspect, the first response information further includes RRC configuration information of the second base station.

With reference to the fifth aspect or any one of the first possible implementation manner of the fifth aspect to the eighth possible implementation manner of the fifth aspect, in a ninth possible implementation manner of the fifth aspect, the sender is further configured to:

send a packet including an RRC message to the second base station by using a GTP transport bearer that is between the first base station and the second base station and associates a radio bearer with another radio bearer, so that the second base station transmits the packet including the RRC message to the UE by using a corresponding SRB or DRB according to the packet.

With reference to the fifth aspect or any one of the first possible implementation manner of the fifth aspect to the ninth possible implementation manner of the fifth aspect, in a tenth possible implementation manner of the fifth aspect, the sender is further configured to:

send, to the second base station by using an SCTP transport bearer of an interface between base stations, second request information used for transmitting an RRC message, so that the second base station transmits the RRC message to the UE by using a corresponding SRB or DRB according to the second request information, where the second request information includes an information element of the RRC message.

According to a sixth aspect, the present invention provides a second base station, including:

a receiver, configured to receive first request information sent by a first base station, where the first request information is used to instruct the second base station to establish a radio bearer between the second base station and user equipment UE, and the radio bearer includes an SRB, or a DRB, or an SRB and a DRB;

a processor, configured to establish the radio bearer between the second base station and the user equipment UE according to an instruction of the first request information; and a sender, configured to send first response information to the first base station, where the first response information includes radio bearer establishment information that is used to indicate, to the first base station, a success or a failure to establish the radio bearer between the second base station and the user equipment UE.

With reference to the sixth aspect, in a first possible implementation manner of the sixth aspect, the first request information includes indication information that instructs the second base station to establish the radio bearer between the second base station and the UE; or the first request information includes a type and/or a priority of the radio bear that the second base station is instructed to establish between the second base station and the UE; or the first request information includes a type and/or a priority of the radio bear that the second base station is instructed to establish between the second base station and the UE, and information about a configuration parameter of the radio bearer; and correspondingly, the processor is specifically configured to:

establish the radio bearer between the second base station and the user equipment UE according to a pre-agreement and the indication information that instructs the second base station to establish the radio bearer between the second base station and the UE and is included in the first request information; or establish the radio bearer between the second base station and the user equipment UE according to the type and/or the priority, of the radio bearer that the second base station is instructed to establish between the second base station and the UE, included in the first request information; or establish the radio bearer between the second base station and the user equipment UE according to the type and/or the priority of the radio bearer that the second base station is instructed to establish between the second base station and the UE, and the information about the configuration parameter of the radio bearer that are included in the first request information.

With reference to the sixth aspect or the first possible implementation manner of the sixth aspect, in a second possible implementation manner of the sixth aspect, the first request information further includes a GTP TEID and information about a transport layer address that are of a radio bearer between the first base station and the UE, which are used to instruct the second base station to return a GTP TEID and information about a transport layer address that are of the radio bearer between the second base station and the UE; and correspondingly, the first response message includes the GTP TEID and the transport layer address that are of the radio bearer between the second base station and the UE.

With reference to the sixth aspect, or the first possible implementation manner of the sixth aspect, or the second possible implementation manner of the sixth aspect, in a third possible implementation manner of the sixth aspect, the receiver is specifically configured to:

receive a request message for establishing an interface between base stations that is sent by the first base station, where the request message for establishing an interface between base stations includes the first request message; and correspondingly, the sender is specifically configured to:

send a response message for establishing an interface between base stations to the first base station, where the response message for establishing an interface between base stations includes the first response information.

With reference to the third possible implementation manner of the sixth aspect, in a fourth possible implementation manner of the sixth aspect, the request message for establishing an interface between base stations further includes physical resource configuration information of the first base station and a C-RNTI of the UE, where the physical resource configuration information of the first base station includes at least one or more of the following information: identification information of the first base station, a PCI of a PCell, ECGI information of the PCell, and a PCI and an ECGI of zero to multiple SCells.

With reference to the third possible implementation manner of the sixth aspect or the fourth possible implementation manner of the sixth aspect, in a fifth possible implementation manner of the sixth aspect, the response message for establishing an interface between base stations further includes physical resource configuration information of the second base station, or a C-RNTI allocated to the UE by the second base station, or physical resource configuration information of the second base station and a C-RNTI allocated to the UE by the second base station, where the physical resource configuration information of the second base station includes at least one or more of the following information: identification of the second base station, a physical cell identifier PCI and ECGI information of one to multiple SCells, and PCI information of an SCell that is configured with a PUCCH.

With reference to the sixth aspect, or the first possible implementation manner of the sixth aspect, or the second possible implementation manner of the sixth aspect, in a sixth possible implementation manner of the sixth aspect, the receiver is specifically configured to:

receive a configuration request message of the second base station that is sent by the first base station, where the configuration request message of the second base station includes the first request message; and correspondingly, the sender is specifically configured to: send a configuration response message of the second base station to the first base station, where the configuration response message of the second base station includes the first response information.

With reference to the sixth possible implementation manner of the sixth aspect, in a seventh possible implementation manner of the sixth aspect, the configuration request message of the second base station further includes one or more of the following information: physical resource configuration information of the second base station, E-RAB configuration information, and SRB configuration information.

With reference to the sixth aspect or any one of the first possible implementation manner of the sixth aspect to the seventh possible implementation manner of the sixth aspect, in an eighth possible implementation manner of the sixth aspect, the first response information further includes RRC configuration information of the second base station.

With reference to the sixth aspect or any one of the first possible implementation manner of the sixth aspect to the eighth possible implementation manner of the sixth aspect, in a ninth possible implementation manner of the sixth aspect, the receiver is specifically configured to:

receive, by the second base station, a packet that includes an RRC message and is sent by the first base station by using a GTP transport bearer that is between the first base station and the second base station and associates a radio bearer with another radio bearer; and the processor is further configured to transmit the packet including the RRC message to the UE by using a corresponding SRB or DRB according to the packet.

With reference to the sixth aspect or any one of the first possible implementation manner of the sixth aspect to the ninth possible implementation manner of the sixth aspect, in a tenth possible implementation manner of the sixth aspect, the receiver is specifically configured to:

receive second request information that is used for transmitting an RRC message and sent to the second base station by the first base station by using an SCTP transport bearer of an interface between base stations; and the processor is further configured to transmit the RRC message to the UE by using a corresponding SRB or DRB according to the second request information, where the second request information includes an information element of the RRC message.

According to the radio bearer establishment method and the base station that are provided in the embodiments of the present invention, a first base station sends first request information to a second base station, so that the second base station establishes a radio bearer between the second base station and user equipment UE according to the first request information, where the radio bearer includes an SRB, or a DRB, or an SRB and a DRB; the first base station receives first response information sent by the second base station, where the first response information includes radio bearer establishment information that is used to indicate, to the first base station, a success or a failure to establish the radio bearer between the second base station and the user equipment UE; and the radio bearer between the second base station and the UE, a transport bearer that associates the radio bearer between the second base station and the UE with a radio bearer between the first base station and the UE, and association information of the transport bearer are established. Then, RRC information generated by the first base station can be forwarded by using the radio bearer between the second base station and the UE, which improves a mobility management function of a communications system and provides a mobility enhancement function, thereby overcoming deficiencies in the prior art that a communications system has a poor mobility management function, and mobility cannot be enhanced because an RRC message can be transmitted between a macro base station and UE only by using a radio bearer between the macro base station and the UE.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

FIG. 1 is a schematic diagram of an architecture of UE and sites in a multi-site network;

FIG. 2 is a schematic flowchart of a radio bearer establishment method according to an embodiment of the present invention;

DESCRIPTION OF EMBODIMENTS

Figure 3:
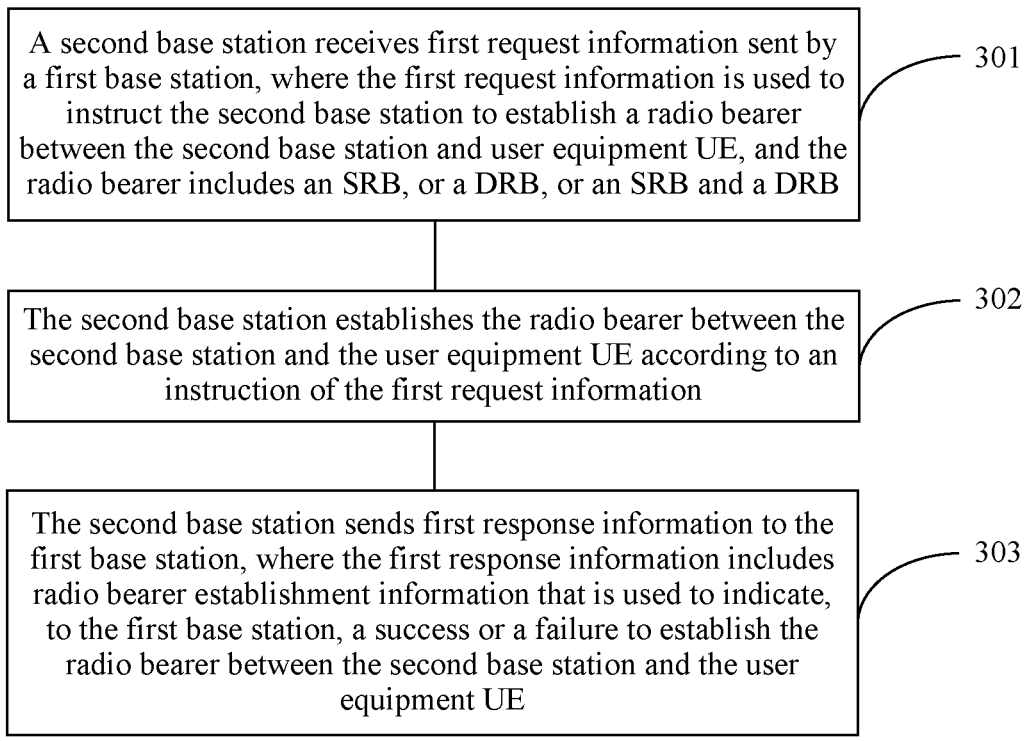
FIG. 3 is a schematic flowchart of another radio bearer establishment method according to an embodiment of the present invention.

The following clearly describes the technical solutions in the embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present invention.

The technical solutions provided by the embodiments of the present invention may be applied to various wireless communications networks, such as: a Global System for Mobile Communications (global system for mobile communication, GSM for short), a Code Division Multiple Access (code division multiple access, CDMA for short) system, a Wideband Code Division Multiple Access (wideband code division multiple access, WCDMA for short) system, a Universal Mobile Telecommunications System (universal mobile telecommunication system, UMTS for short), a general packet radio service (general packet radio service, GPRS for short) system, a Long Term Evolution (long term evolution, LTE for short) system, a Long Term Evolution Advanced (long term evolution advanced, LTE-A for short) system, and a Worldwide Interoperability for Microwave Access (worldwide interoperability for microwave access, WiMAX for short) system. The terms "network" and "system" may be interchanged.

In the embodiments of the present invention, a base station (base station, BS for short) may be a device that performs communication with user equipment (user equipment, UE for short) or another communications station such as a relay station, and the base station may provide communications coverage of a specific physical area. For example, the base station may be specifically a base transceiver station (Base Transceiver Station, BTS for short) or a base station controller (Base Station Controller, BSC for short) in GSM or CDMA; or may be a node B (Node B, NB for short) in UMTS or a radio network controller (Radio Network Controller, RNC for short) in UMTS; or may be an evolved NodeB (Evolutional Node B, ENB or eNodeB for short) in LTE; or may be another access network device that provides an access service in the wireless communications network, which is not limited in the present invention.

According to a small cell enhancement (small cell enhancement, SCE for short) study item (study item, SI for short) of the 3GPP, when a small cell is in a coverage area of a macro cell, UE may be wirelessly connected to both the macro cell and the small cell, where the small cell and the macro cell respectively belong to a micro base station and a macro base station. When the small cell is outside the coverage area of the macro cell, the UE may be wirelessly connected to only the small cell, or has a radio interface only to the macro cell or the small cell at a moment. Generally, the macro base station may be used as a master eNodeB (master eNB, MeNB for short), and the micro base station is used as a secondary eNodeB (secondary eNB, SeNB for short), where an interface between base stations is established between the MeNB and the SeNB and used to transmit control information and data information. According to the SCE item, radio resource control (radio resource control, RRC for short) configuration information may be transmitted to the UE by using the MeNB and/or the SeNB, so as to improve reliability of an RRC message and enhance performance in mobility. However, how to implement these functions is not disclosed. For example, referring to FIG. 1, an MeNB may directly transmit a generated RRC message to UE by using a radio interface between the MeNB and the UE; or an MeNB may first transmit a generated RRC message to an SeNB by using an interface between base stations, and then the SeNB transmits the RRC message to UE by using a radio interface between the SeNB and the UE.

According to a description of the present invention, an MeNB instructs an SeNB to establish an SRB and/or a DRB of a high priority and then to establish, on an interface between the MeNB and the SeNB, a transport bearer of the foregoing SRB or DRB and association information; then the MeNB may transmit a generated RRC message to the SeNB by using the transport bearer corresponding to the interface between the base stations, and the SeNB transmits the RRC message to UE by using a corresponding radio bearer between the SeNB and the UE according to the association information.

Embodiment 1

Embodiment 1 of the present invention provides a radio bearer establishment method. Referring to FIG. 2, the method may include:

201. A first base station sends first request information to a second base station, so that the second base station establishes a radio bearer between the second base station and user equipment UE according to the first request information, where the radio bearer includes an SRB, or a DRB, or an SRB and a DRB.

The first base station is an MeNB, and the second base station is an SeNB.

Preferably, in a multi-site network environment, generally, a macro base station is used as an MeNB, and a micro base station is used as an SeNB; certainly, any base station may be selected as an MeNB, and a remaining base station is used as an SeNB, which is not specifically limited in the present invention.

The SRB is used for transmitting an RRC message between the UE and an eNB. A type of the SRB may include an SRB0, an SRB1, and an SRB2, and includes at least the SRB1 or the SRB2. An SRB0 between the second base station and the UE is used for sending a radio resource control connection reconfiguration message to the UE by the second base station, or sending, by the UE to the second base station, a radio resource control connection reconfiguration request message that is used to reconfigure an SRB1 or an SRB2 between the second base station and the UE. The SRB1 and the SRB2 between the second base station and the UE are used for transmitting an RRC message between the second base station and the UE. The SRB0, the SRB1, and the SRB2 between the second base station and the UE are associated with an SRB0, an SRB1, and an SRB2 between the first base station and the UE by using a corresponding transport bearer between the base stations. The first base station instructs the second base station to establish the foregoing SRB and/or DRB, and the first base station also establishes the foregoing SRB and/or DRB with the UE.

The DRB includes a DRB that is used for transmitting an RRC message and a DRB that is used for transmitting user data, where a priority of the DRB that is used for transmitting an RRC message is higher than that of the DRB that is used for transmitting user data. There may be one or more DRBs that are used for transmitting an RRC message and associated with the radio bearers SRB0, SRB1, and SRB2 between the MeNB and the UE by using the transport bearer between the macro base station and the micro base station. The DRB that is used for transmitting user data and an S1 bearer between an SGW and the first base station or the second base station are in a one-to-one correspondence with each other and jointly form an E-RAB that is used for transmitting user plane data between the UE and the SGW.

Optionally, the first request information may include indication information that instructs the second base station to establish the radio bearer between the second base station and the UE.

Specifically, the first base station and the second base station may pre-agree on a type of the radio bearer that is established between the second base station and the UE by the second base station. When the first base station needs to instruct the second base station to establish the radio bearer between the second base station and the UE, the first base station needs to give only the indication information, that is, the first request information that is sent to the second base station by the first base station may include the indication information that instructs the second base station to establish the radio bearer between the second base station and the UE.

Alternatively, the first request information may include a type and/or a priority of the radio bear that the second base station is instructed to establish between the second base station and the UE.

Optionally, if the first base station and the second base station do not pre-agree on a type of the radio bearer that is established between the second base station and the UE by the second base station, when the first base station needs to instruct the second base station to establish the radio bearer between the second base station and the UE, the second base station needs to be notified of the type and/or the priority of the radio bearer that needs to be established, that is, the first request information that is sent to the second base station by the first base station may include the type and/or the priority of the radio bearer that the second base station is instructed to establish between the second base station and the UE.

Alternatively, the first request information may include a type and/or a priority of the radio bear that the second base station is instructed to establish between the second base station and the UE, and information about a configuration parameter of the radio bearer.

Further, the first base station may instruct the second base station to start to establish the radio bearer between the second base station and the UE and notify the second base station of the type of the radio bearer, and the first base station may further specify the configuration parameter of the radio bearer that is established between the second base station and the UE by the second base station, that is, the first request information that is sent to the second base station by the first base station may include the type and/or the priority of the radio bearer that the second base station is instructed to establish between the second base station and the UE, and the information about the configuration parameter of the radio bearer.

Further, the first request information may further include a GTP TEID and information about a transport layer address that are of a radio bearer between the first base station and the UE, which are used to instruct the second base station to return a GTP TEID and information about a transport layer address that are of the radio bearer between the second base station and the UE, so as to establish a GTP transport bearer for the radio bearer between the first base station and the UE and the radio bearer between the second base station and the UE.

Optionally, the first base station sends the first request information to the second base station in a manner that includes but is not limited to the following two manners:

1. The first base station sends a request message for establishing an interface between base stations to the second base station, where the request message for establishing an interface between base stations includes the first request information.

The interface between base stations may be an X2 interface between base stations, or may be an Xn interface between base stations, or may be another interface between base stations. It should be noted that a type of the interface between base stations is not specifically limited in the present invention.

Further, the request information for establishing an interface between base stations may further include physical resource configuration information of the first base station and a C-RNTI of the UE, where the physical resource configuration information of the first base station may include at least one or more of the following information: identification information of the first base station, a PCI of a PCell, ECGI information of the PCell, and a PCI and an ECGI of zero to multiple SCells.

2. The first base station sends configuration request information of the second base station to the second base station, where the configuration request information of the second base station includes the first request information.

The configuration request information of the second base station may further include one or more of the following information: physical resource configuration information of the second base station, E-RAB configuration information, and SRB configuration information.

202. The first base station receives first response information sent by the second base station, where the first response information includes radio bearer establishment information that is used to indicate, to the first base station, a success or a failure to establish the radio bearer between the second base station and the user equipment UE.

The first response information may include the GTP TEID and the information about the transport layer address that are of the radio bearer between the second base station and the UE.

Further, the first response information may further include RRC configuration information of the second base station, so that the first base station generates an RRC message.

Optionally, the first base station receives, in a manner that includes but is not limited to the following two manners, the first response information sent by the second base station:

1. The first base station receives a response message for establishing an interface between base stations that is sent by the second base station, where the response message for establishing an interface between base stations includes the first response information.

Further, the response message for establishing an interface between base stations further includes physical resource configuration information of the second base station, or a C-RNTI allocated to the UE by the second base station, or physical resource configuration information of the second base station and a C-RNTI allocated to the UE by the second base station.

The interface between base stations may be an X2 interface between base stations, or may be an Xn interface between base stations, or may be another interface between base stations. It should be noted that the type of the interface between base stations is not specifically limited in the present invention.

The physical resource configuration information of the second base station may include at least one or more of the following information: identification of the second base station, a PCI and ECGI information of one to multiple SCells, and PCI information of an SCell that is configured with a PUCCH.

2. The first base station receives a configuration response message of the second base station that is sent by the second base station, where the configuration response message of the second base station includes the first response information.

Optionally, the method may further include: sending, by the first base station, a packet including an RRC message to the second base station by using a GTP transport bearer that is between the first base station and the second base station and associates a radio bearer with another radio bearer, so that the second base station transmits the packet including the RRC message to the UE by using a corresponding SRB or DRB according to the packet.

Optionally, the method may further include: sending, by the first base station to the second base station by using an SCTP transport bearer of an interface between base stations, second request information used for transmitting an RRC message, so that the second base station transmits the RRC message to the UE by using a corresponding SRB or DRB according to the second request information, where the second request information includes an information element of the RRC message.

Optionally, the second request message may further include an SRB type corresponding to the RRC message, so that the second base station determines, according to the SRB type that is corresponding to the RRC message and included in the second request message, whether to send the RRC message by using the SRB1 or the SRB2.

The interface between base stations may be an X2 interface between base stations, or may be an Xn interface between base stations, or may be another interface between base stations. It should be noted that the type of the interface between base stations is not specifically limited in the present invention.

According to the radio bearer establishment method provided in this embodiment of the present invention, a first base station sends first request information to a second base station, so that the second base station establishes a radio bearer between the second base station and user equipment UE according to the first request information, where the radio bearer includes an SRB, or a DRB, or an SRB and a DRB; the first base station receives first response information sent by the second base station, where the first response information includes radio bearer establishment information that is used to indicate, to the first base station, a success or a failure to establish the radio bearer between the second base station and the user equipment UE; and the radio bearer between the second base station and the UE, a transport bearer that associates the radio bearer between the second base station and the UE with a radio bearer between the first base station and the UE, and association information of the transport bearer are established. Then, RRC information generated by the first base station can be forwarded by using the radio bearer between the second base station and the UE, which improves a mobility management function of a communications system and provides a mobility enhancement function, thereby overcoming deficiencies in the prior art that a communications system has a poor mobility management function, and mobility cannot be enhanced because an RRC message can be transmitted between a macro base station and UE only by using a radio bearer between the macro base station and the UE.

Embodiment 2

Embodiment 2 of the present invention provides another radio bearer establishment method. Referring to FIG. 3, the method may include:

301. A second base station receives first request information sent by a first base station, where the first request information is used to instruct the second base station to establish a radio bearer between the second base station and user equipment UE, and the radio bearer includes an SRB, or a DRB, or an SRB and a DRB.

The first base station is an MeNB, and the second base station is an SeNB.

Preferably, in a multi-site network environment generally, a macro base station is used as an MeNB, and a micro base station is used as an SeNB. Certainly, any base station may be selected as an MeNB, and a remaining base station is used as an SeNB, which is not specifically limited in the present invention.

Optionally, the first request information may include indication information that instructs the second base station to establish the radio bearer between the second base station and the UE; or the first request information may include a type and/or a priority of the radio bear that the second base station is instructed to establish between the second base station and the UE; or the first request information may include a type and/or a priority of the radio bear that the second base station is instructed to establish between the second base station and the UE, and information about a configuration parameter of the radio bearer.

Further, the first request information may further include a GTP TEID and information about a transport layer address that are of a radio bearer between the first base station and the UE, which are used to instruct the second base station to return a GTP TEID and information about a transport layer address that are of the radio bearer between the second base station and the UE, so as to establish a GTP transport bearer for the radio bearer between the first base station and the UE and the radio bearer between the second base station and the UE.

Optionally, the second base station receives, in a manner that includes but is not limited to the following two manners, the first request information sent by the first base station:

1. The second base station receives a request message for establishing an interface between base stations that is sent by the first base station, where the request message for establishing an interface between base stations includes the first request message.

The interface between base stations may be an X2 interface between base stations, or may be an Xn interface between base stations, or may be another interface between base stations. It should be noted that a type of the interface between base stations is not specifically limited in the present invention.

Further, the request information for establishing an interface between base stations may further include physical resource configuration information of the first base station and a C-RNTI of the UE, where the physical resource configuration information of the first base station may include at least one or more of the following information: identification information of the first base station, a PCI of a PCell, ECGI information of the PCell, and a PCI and an ECGI of zero to multiple SCells.

2. The second base station receives a configuration request message of the second base station that is sent by the first base station, where the configuration request message of the second base station includes the first request message.

The configuration request information of the second base station may further include one or more of the following information: physical resource configuration information of the second base station, E-RAB configuration information, and SRB configuration information.

302. The second base station establishes the radio bearer between the second base station and the user equipment UE according to an instruction of the first request information.

Optionally, that the second base station establishes the radio bearer between the second base station and the user equipment UE according to the instruction of the first request information may include the following:

The second base station establishes the radio bearer between the second base station and the user equipment UE according to a pre-agreement and the indication information that instructs the second base station to establish the radio bearer between the second base station and the UE and is included in the first request information.

Specifically, the first base station and the second base station may pre-agree on the type of the radio bearer that is established between the second base station and the UE by the second base station. When the first base station needs to instruct the second base station to establish the radio bearer between the second base station and the UE, the first base station only needs to provide the indication information, that is, the first request information that is sent to the second base station by the first base station may include the indication information that instructs the second base station to establish the radio bearer between the second base station and the UE. When the second base station receives the first request information that includes the indication information that instructs the second base station to establish the radio bearer between the second base station and the UE, the second base station establishes the radio bearer between the second base station and the user equipment UE according to the pre-agreement and the indication information that instructs the second base station to establish the radio bearer between the second base station and the UE and is included in the first request information.

Alternatively, the second base station establishes the radio bearer between the second base station and the user equipment UE according to the type and/or the priority, of the radio bearer that the second base station is instructed to establish between the second base station and the UE, included in the first request information.

Optionally, if the first base station and the second base station do not pre-agree on the type of the radio bearer that is established between the second base station and the UE by the second base station, when the first base station needs to instruct the second base station to establish the radio bearer between the second base station and the UE, the second base station needs to be notified of the type and/or the priority of the radio bearer that needs to be established. That is, the first request information that is sent to the second base station by the first base station may include the type and/or the priority of the radio bearer that the second base station is instructed to establish between the second base station and the UE. When the second base station receives the first request information that includes the type and/or the priority of the radio bearer that the second base station is instructed to establish between the second base station and the UE, the second base station establishes the radio bearer between the second base station and the user equipment UE according to the type and/or the priority, of the radio bearer that the second base station is instructed to establish between the second base station and the UE, included in the first request information.

Alternatively, the second base station establishes the radio bearer between the second base station and the user equipment UE according to the type and/or the priority of the radio bearer that the second base station is instructed to establish between the second base station and the UE, and the information about the configuration parameter of the radio bearer that are included in the first request information.

Further, the first base station may instruct the second base station to start to establish the radio bearer between the second base station and the UE and notify the second base station of the type of the radio bearer, and the first base station may further specify the configuration parameter of the radio bearer that is established between the second base station and the UE by the second base station. That is, the first request information that is sent to the second base station by the first base station may include the type and/or the priority of the radio bearer that the second base station is instructed to establish between the second base station and the UE, and the information about the configuration parameter of the radio bearer. When the second base station receives the first request information that includes the type and/or the priority of the radio bearer that the second base station is instructed to establish between the second base station and the UE, and the information about the configuration parameter of the radio bearer, the second base station establishes the radio bearer between the second base station and the user equipment UE according to the type and/or the priority of the radio bearer that the second base station is instructed to establish between the second base station and the UE, and the information about the configuration parameter of the radio bearer that are included in the first request information.

Further, the radio bearer that is established between the second base station and the UE by the second base station includes a Radio Link Control (radio link control, RLC for short) entity, a Medium Access Control (medium access control, MAC for short) entity, and a logical channel (logical channel, LCH for short), and optionally, further includes a Packet Data Convergence Protocol (packet data convergence protocol, PDCP for short) entity.

303. The second base station sends first response information to the first base station, where the first response information includes radio bearer establishment information that is used to indicate, to the first base station, a success or a failure to establish the radio bearer between the second base station and the user equipment UE.

Optionally, the first response message may include the GTP TEID and the information about the transport layer address that are of the radio bearer between the second base station and the UE.

Optionally, the first response information may further include RRC configuration information of the second base station, so that the first base station generates an RRC message.

Optionally, the second base station sends the first response information to the first base station in a manner that includes but is not limited to the following two manners:

1. The second base station sends a response message for establishing an interface between base stations to the first base station, where the response message for establishing an interface between base stations includes the first response information.

The interface between base stations may be an X2 interface between base stations, or may be an Xn interface between base stations, or may be another interface between base stations. It should be noted that the type of the interface between base stations is not specifically limited in the present invention.

Further, the response message for establishing an interface between base stations may further include physical resource configuration information of the second base station, or a C-RNTI allocated to the UE by the second base station, or physical resource configuration information of the second base station and a C-RNTI allocated to the UE by the second base station.

The physical resource configuration information of the second base station may include at least one or more of the following information: identification of the second base station, a PCI and ECGI information of one to multiple SCells, and PCI information of an SCell that is configured with a PUCCH.

2. The second base station sends a configuration response message of the second base station to the first base station, where the configuration response message of the second base station includes the first response information.

Optionally, the method may further include:

receiving, by the second base station, a packet that includes an RRC message and is sent by the first base station by using a GTP transport bearer that is between the first base station and the second base station and associates a radio bearer with another radio bearer; and transmitting, by the second base station, the packet including the RRC message to the UE by using a corresponding SRB or DRB according to the packet.

Optionally, the method may further include:

receiving, by the second base station, second request information that is used for transmitting an RRC message and sent to the second base station by the first base station by using an SCTP transport bearer of an interface between base stations; and transmitting, by the second base station, the RRC message to the UE by using a corresponding SRB or DRB according to the second request information, where the second request information includes an information element of the RRC message.

Optionally, the second request information may further include an SRB type corresponding to the RRC message. Correspondingly, when the second base station receives the second request information sent by the first base station, the second base station determines, according to the SRB type that is corresponding to the RRC message and included in the second request message, whether to send the RRC message by using an SRB1 or an SRB2.

Exemplarily, if the SRB type included in the second request message is a default type, the second base station selects, according to a predefined correspondence between an SRB type and an RRC message type, the SRB1 or the SRB2 to send the RRC message.

According to the radio bearer establishment method provided in this embodiment of the present invention, a second base station receives first request information sent by a first base station, where the first request information is used to instruct the second base station to establish a radio bearer between the second base station and user equipment UE, and the radio bearer includes an SRB, or a DRB, or an SRB and a DRB; the second base station establishes the radio bearer between the second base station and the user equipment UE according to an instruction of the first request information; the second base station sends first response information to the first base station, where the first response information includes radio bearer establishment information that is used to indicate, to the first base station, a success or a failure to establish the radio bearer between the second base station and the user equipment UE; and the radio bearer between the second base station and the UE, a transport bearer that associates the radio bearer between the second base station and the UE with a radio bearer between the first base station and the UE, and association information of the transport bearer are established. Then, RRC information generated by the first base station can be forwarded by using the radio bearer between the second base station and the UE, which improves a mobility management function of a communications system and provides a mobility enhancement function, thereby overcoming deficiencies in the prior art that a communications system has a poor mobility management function, and mobility cannot be enhanced because an RRC message can be transmitted between a macro base station and UE only by using a radio bearer between the macro base station and the UE.

Embodiment 3

Embodiment 3 of the present invention provides a radio bearer establishment method. The method is described by using an example in which a macro base station and a micro base station are configured in a multi-site network environment, and an SRB is established by cooperation of the macro base station and the micro base station in a process of establishing an Xn interface.

Certainly, a radio bearer may further be established by cooperation of the macro base station and the micro base station in a process of establishing another interface between base stations, which is not limited in the present invention.

Figure 4:
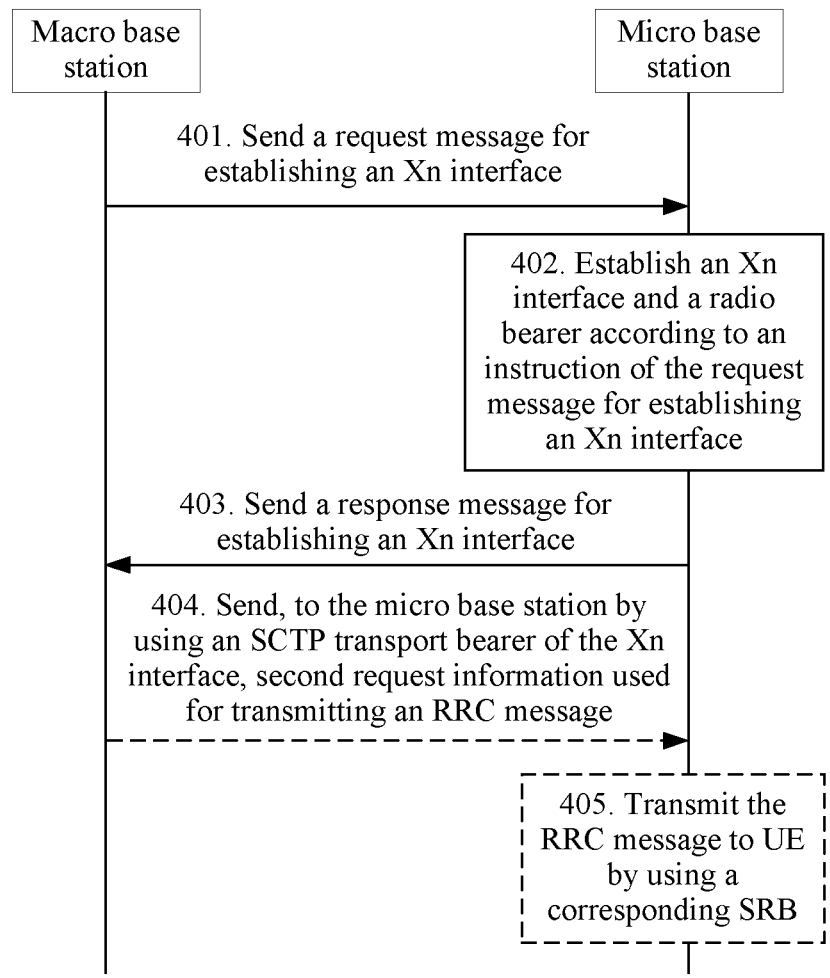
FIG. 4 is a schematic flowchart of still another radio bearer establishment method according to an embodiment of the present invention.

Referring to FIG. 4, the method may include:

401. The macro base station sends a request message for establishing an Xn interface to the micro base station.

Preferably, in the multi-site network environment, the macro base station is used as a first base station, and the micro base station is used as a second base station. Certainly, that the macro base station is used as a first base station, and the micro base station is used as a second station is only used as an example in this embodiment of the present invention to describe the radio bearer establishment method.

The request message for establishing an Xn interface includes first request information that is used to instruct the micro base station to establish an SRB between the micro base station and user equipment UE, where the first request information includes indication information that instructs the micro base station to establish the SRB between the micro base station and the UE.

The macro base station and the micro base station pre-agree that an SRB1 or an SRB2 is to be established between the micro base station and the UE.

Preferably, in this embodiment, the request information for establishing an Xn interface further includes physical resource configuration information of the macro base station and a C-RNTI of the UE, where the physical resource configuration information of the macro base station may include at least one or more of the following information: identification information of the macro base station, a PCI of a PCell, ECGI information of the PCell, and a PCI and an ECGI of zero to multiple SCells.

402. The micro base station establishes the Xn interface and a radio bearer according to an instruction of the request message for establishing an Xn interface.

The micro base station establishes the Xn interface according to the physical resource configuration information of the macro base station and the C-RNTI of the UE that are included in the request message for establishing an Xn interface.

Specifically, when the micro base station receives the request message for establishing an Xn interface, the micro base station establishes the SRB1 or the SRB2 between the micro base station and the user equipment UE according to a pre-agreement and the indication information that instructs the micro base station to establish the radio bearer between the micro base station and the UE and is included in the first request information in the request message for establishing an Xn interface.

403. The micro base station sends a response message for establishing an Xn interface to the macro base station.

The response message for establishing an Xn interface includes first response information, where the first response information includes radio bearer establishment information that is used to indicate, to the macro base station, a success or a failure to establish the SRB between the second base station and the user equipment UE.

Preferably, in this embodiment of the present invention, the response message for establishing an Xn interface further includes physical resource configuration information of the micro base station, or a C-RNTI allocated to the UE by the micro base station, or physical resource configuration information of the micro base station and a C-RNTI allocated to the UE by the micro base station, where the physical resource configuration information of the micro base station may include at least one or more of the following information: identification of the micro base station, a PCI and ECGI information of one to multiple SCells, and PCI information of an SCell that is configured with a PUCCH.

Further, the first response information further includes RRC configuration information of the micro base station. The micro base station may send the RRC configuration information of the micro base station to the macro base station by using the first response information, so that the macro base station generates an RRC message.

404. The macro base station sends, to the micro base station by using an SCTP transport bearer of the Xn interface, second request information used for transmitting an RRC message.

If the first response information included in the response message for establishing an Xn interface, which is sent by the micro base station and received by the macro base station, indicates the success of establishing the SRB by the micro base station, the macro base station sends, to the micro base station by using the SCTP transport bearer of the Xn interface, the second request information that is used for transmitting the RRC message and used to request the micro base station to transmit the RRC message to the UE.

The second request information includes an information element of the RRC message and an SRB type corresponding to the RRC message.

405. The micro base station transmits the RRC message to the UE by using a corresponding SRB.

Specifically, the micro base station determines, according to an indication of the SRB type that is corresponding to the RRC message and included in the second request information, to transmit the RRC message to the UE by using the SRB1 or the SRB2.

According to the radio bearer establishment method provided in this embodiment of the present invention, a macro base station sends a request message for establishing an Xn interface to a micro base station; the micro base station establishes the Xn interface and a radio bearer according to an instruction of the request message for establishing an Xn interface; the micro base station sends a response message for establishing an Xn interface to the macro base station; the macro base station sends, to the micro base station by using the Xn interface, second request information used for transmitting an RRC message; and the radio bearer between the micro base station and UE, a transport bearer that associates the radio bearer between the micro base station and the UE with a radio bearer between the macro base station and the UE, and association information of the transport bearer are established. Then, RRC information generated by the macro base station can be forwarded by using the radio bearer between the micro base station and the UE, which improves a mobility management function of a communications system and provides a mobility enhancement function, thereby overcoming deficiencies in the prior art that a communications system has a poor mobility management function, and mobility cannot be enhanced because an RRC message can be transmitted between a macro base station and UE only by using a radio bearer between the macro base station and the UE.

Embodiment 4

Figure 5:
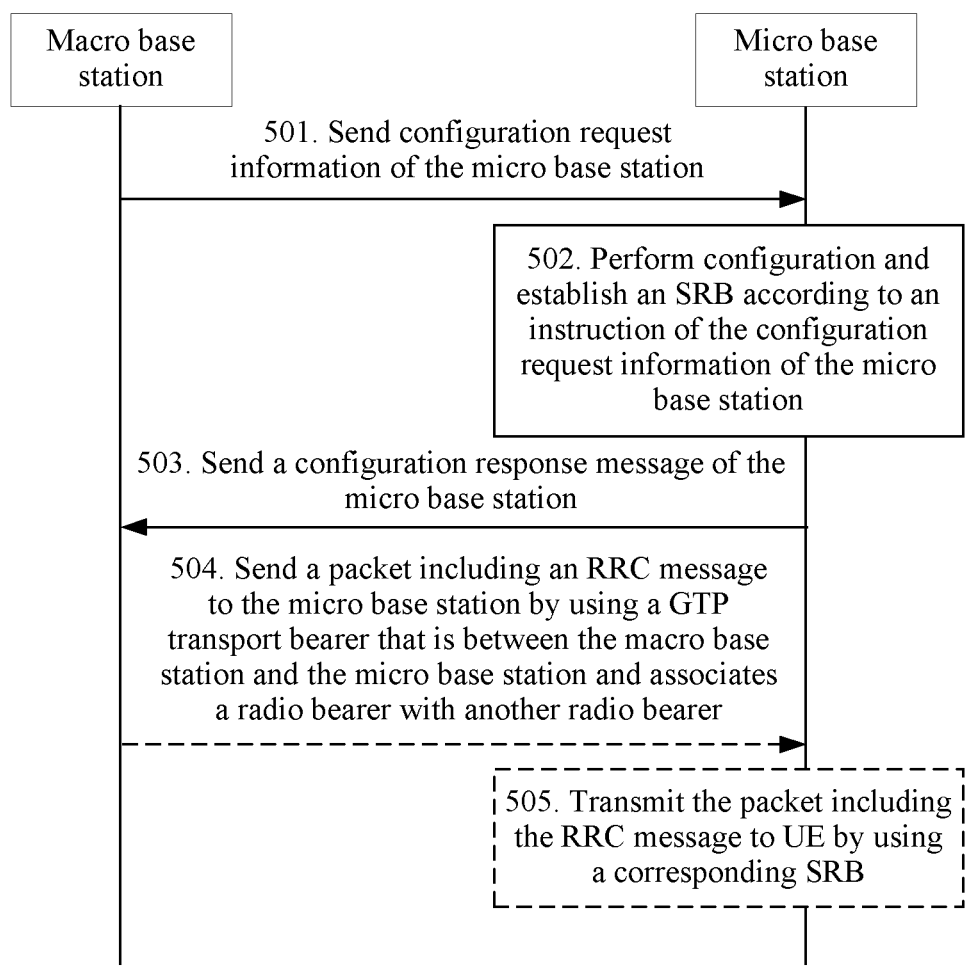
FIG. 5 is a schematic flowchart of yet another radio bearer establishment method according to an embodiment of the present invention.

Embodiment 4 of the present invention provides a radio bearer establishment method of which a principle is the same as that of Embodiment 2. The method is described by using an example in which a macro base station and a micro base station are configured in a multi-site network environment, an interface between base stations is established between the macro base station and the micro base station, and an SRB is established by cooperation of the macro base station and the micro base station. Referring to FIG. 5, the method may include:

501. The macro base station sends configuration request information of the micro base station to the micro base station.

Preferably, in the multi-site network environment, the macro base station is used as a first base station, and the micro base station is used as a second base station. Certainly, that the macro base station is used as a first base station, and the micro base station is used as a second station is only used as an example in this embodiment of the present invention to describe the radio bearer establishment method.

The configuration request information of the micro base station includes first request information that is used to instruct the micro base station to establish an SRB between the micro base station and user equipment UE, where the first request information further includes types SRB1 and SRB2 of the SRB that the micro base station is instructed to establish between the micro base station and the UE.

Further, the first request information further includes a GTP TEID and information about a transport layer address that are of a radio bearer between the macro base station and the UE, which are used to instruct the micro base station to return a GTP TEID and information about a transport layer address that are of the radio bearer between the micro base station and the UE. Therefore, a GTP transport bearer is established for the radio bearer between the macro base station and the UE and the radio bearer between the micro base station and the UE.

Optionally, in this embodiment, the configuration request information of the micro base station further includes physical resource configuration information of the macro base station and a C-RNTI of the UE, where the physical resource configuration information of the macro base station may include at least one or more of the following information: identification information of the macro base station, a PCI of a PCell, ECGI information of the PCell, and a PCI and an ECGI of zero to multiple SCells.

502. The micro base station performs configuration and establishes an SRB according to an instruction of the configuration request information of the micro base station.

The micro base station establishes the radio bearers SRB1 and SRB2 between the micro base station and the user equipment UE according to the types SRB1 and SRB2, of the radio bearer that the micro base station is instructed to establish between the micro base station and the UE, included in the first request information in the configuration request information of the micro base station.

503. The micro base station sends a configuration response message of the micro base station to the macro base station.

The configuration response message of the micro base station includes first response information, where the first response information includes radio bearer establishment information that is used to indicate, to the macro base station, a success or a failure to establish the SRB between the micro base station and the user equipment UE.

Preferably, in this embodiment, the configuration response message of the micro base station further includes physical resource configuration information of the micro base station, or a C-RNTI allocated to the UE by the micro base station, or physical resource configuration information of the micro base station and a C-RNTI allocated to the UE by the micro base station.

The physical resource configuration information of the micro base station may include at least one or more of the following information: identification of the micro base station, a PCI and ECGI information of one to multiple SCells, and PCI information of an SCell that is configured with a PUCCH.

Further, the first response information further includes a GTP TEID and a transport layer address that are of the SRB between the micro base station and the UE. Specifically, according to an instruction of the GTP TEID and the information about the transport layer address that are of the radio bearer between the macro base station and the UE and included in the first request information, the micro base station needs to return the GTP TEID and information about the transport layer address that are of the SRB between the micro base station and the UE, where the GTP TEID and the transport layer address that are of the SRB between the micro base station and the UE may be included in the first response information to be sent to the macro base station.

Optionally, the first response information may further include RRC configuration information of the micro base station. The micro base station may send the RRC configuration information of the micro base station to the macro base station by using the first response information, so that the macro base station generates an RRC message.

504. The macro base station sends a packet including an RRC message to the micro base station by using a GTP transport bearer that is between the macro base station and the micro base station and associates a radio bearer with another radio bearer.

If the first response information included in the configuration response message of the micro base station that is sent by the micro base station and received by the macro base station indicates the success of establishing the SRB by the micro base station, the macro base station sends the packet including the RRC message to the micro base station by using the GTP transport bearer that is between the macro base station and the micro base station and associates a radio bearer with another radio bearer.

505. The micro base station transmits the packet including the RRC message to the UE by using a corresponding SRB.

Specifically, the micro base station transmits the packet including the RRC message to the UE by using a corresponding SRB of the GTP transport bearer according to the packet.

According to the radio bearer establishment method provided in this embodiment of the present invention, a macro base station sends configuration request information of a micro base station to the micro base station; the micro base station performs configuration and establishes a radio bearer according to an instruction of the configuration request information of the micro base station; the micro base station sends a configuration response message of the micro base station to the macro base station; the macro base station sends a packet including an RRC message to the micro base station by using a GTP transport bearer that is between the macro base station and the micro base station and that associates a radio bearer with another radio bearer; the micro base station transmits the packet including the RRC message to the UE by using a corresponding SRB; and the radio bearer between the micro base station and UE, a transport bearer that associates the radio bearer between the micro base station and the UE with a radio bearer between the macro base station and the UE, and association information of the transport bearer are established. Then, the RRC message generated by the macro base station can be forwarded by using the radio bearer between the micro base station and the UE, which improves a mobility management function of a communications system and provides a mobility enhancement function, thereby overcoming deficiencies in the prior art that a communications system has a poor mobility management function, and mobility cannot be enhanced because an RRC message can be transmitted between a macro base station and UE only by using a radio bearer between the macro base station and the UE.

Embodiment 5

Figure 6:
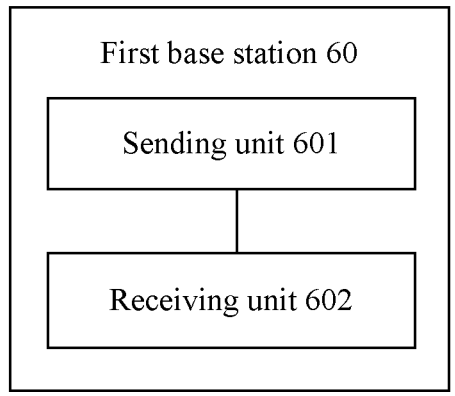
FIG. 6 is a schematic diagram of a structure of an apparatus of a first base station according to an embodiment of the present invention.

Embodiment 5 of the present invention provides a first base station 60. Referring to FIG. 6, the first base station 60 may include:

a sending unit 601, configured to send first request information to a second base station, so that the second base station establishes a radio bearer between the second base station and user equipment UE according to the first request information, where the radio bearer includes an SRB, or a DRB, or an SRB and a DRB; and a receiving unit 602, configured to receive first response information sent by the second base station, where the first response information includes radio bearer establishment information that is used to indicate, to the first base station, a success or a failure to establish the radio bearer between the second base station and the user equipment UE.

The first request information includes indication information that instructs the second base station to establish the radio bearer between the second base station and the UE; or the first request information includes a type and/or a priority of the radio bear that the second base station is instructed to establish between the second base station and the UE; or the first request information includes a type and/or a priority of the radio bear that the second base station is instructed to establish between the second base station and the UE, and information about a configuration parameter of the radio bearer.

Further, the first request information may further include a GTP TEID and information about a transport layer address that are of a radio bearer between the first base station and the UE, which are used to instruct the second base station to return a GTP TEID and information about a transport layer address that are of the radio bearer between the second base station and the UE.

Correspondingly, the first response information may include the GTP TEID and the transport layer address that are of the radio bearer between the second base station and the UE.

The sending unit 601 is further specifically configured to:

send a request message for establishing an interface between base stations to the second base station, where the request message for establishing an interface between base stations includes the first request information.

Correspondingly, the receiving unit 602 is further specifically configured to:

receive a response message for establishing an interface between base stations that is sent by the second base station, where the response message for establishing an interface between base stations includes the first response information.

Exemplarily, the request information for establishing an interface between base stations further includes physical resource configuration information of the first base station and a C-RNTI of the UE, where the physical resource configuration information of the first base station includes at least one or more of the following information: identification information of the first base station, a PCI of a PCell, ECGI information of the PCell, and a PCI and an ECGI of zero to multiple SCells.

Exemplarily, the response message for establishing an interface between base stations further includes physical resource configuration information of the second base station, or a C-RNTI allocated to the UE by the second base station, or physical resource configuration information of the second base station and a C-RNTI allocated to the UE by the second base station.

The physical resource configuration information of the second base station includes at least one or more of the following information: identification of the second base station, a physical cell identifier PCI and ECGI information of one to multiple SCells, and PCI information of an SCell that is configured with a PUCCH.

Optionally, the sending unit 601 may be specifically configured to:

send configuration request information of the second base station to the second base station, where the configuration request information of the second base station includes the first request information.

Correspondingly, the receiving unit 602 may be specifically configured to:

receive a configuration response message of the second base station that is sent by the second base station, where the configuration response message of the second base station includes the first response information.

Exemplarily, the configuration request information of the second base station further includes one or more of the following information: physical resource configuration information of the second base station, E-RAB configuration information, and SRB configuration information.

Optionally, the first response information further includes RRC configuration information of the second base station.

The sending unit 601 may be further configured to:

send a packet including an RRC message to the second base station by using a GTP transport bearer that is between the first base station and the second base station and associates a radio bearer with another radio bearer, so that the second base station transmits the packet including the RRC message to the UE by using a corresponding SRB or DRB according to the packet.

Optionally, the sending unit 601 may be further configured to:

send, to the second base station by using an SCTP transport bearer of an interface between base stations, second request information used for transmitting an RRC message, so that the second base station transmits the RRC message to the UE by using a corresponding SRB or DRB according to the second request information, where the second request information includes an information element of the RRC message.

The first base station 60 provided in this embodiment may be configured to perform actions of the first base station in the foregoing method Embodiment 1. For example, the sending unit 601 may perform 201, and the receiving unit 602 may perform 202.

The first base station provided in this embodiment of the present invention sends first request information to a second base station, so that the second base station establishes a radio bearer between the second base station and user equipment UE according to the first request information, where the radio bearer includes a signaling radio bearer SRB, or a data radio bearer DRB, or an SRB and a DRB; the first base station receives first response information sent by the second base station, where the first response information includes radio bearer establishment information that is used to indicate, to the first base station, a success or a failure to establish the radio bearer between the second base station and the user equipment UE; and the radio bearer between the second base station and the UE, a transport bearer that associates the radio bearer between the second base station and the UE with a radio bearer between the first base station and the UE, and association information of the transport bearer are established. Then, RRC information generated by the first base station can be forwarded by using the radio bearer between the second base station and the UE, which improves a mobility management function of a communications system and provides a mobility enhancement function, thereby overcoming deficiencies in the prior art that a communications system has a poor mobility management function, and mobility cannot be enhanced because an RRC message can be transmitted between a macro base station and UE only by using a radio bearer between the macro base station and the UE.

Embodiment 6

Figure 7:
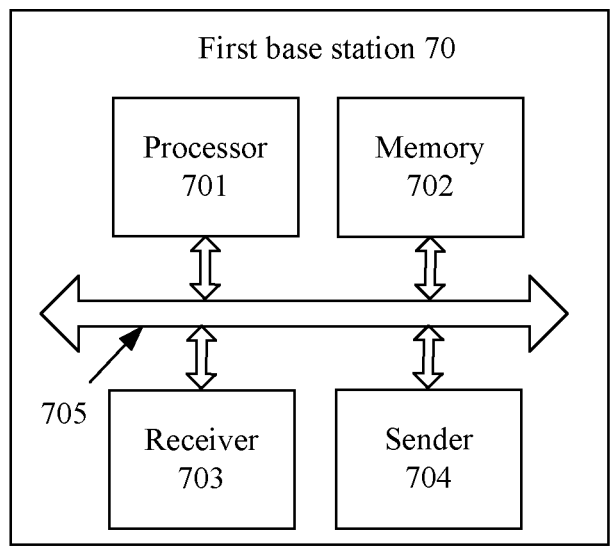
FIG. 7 is a schematic diagram of a structure of an apparatus of another first base station according to an embodiment of the present invention.

Embodiment 6 of the present invention provides another first base station 70. Referring to FIG. 7, the first base station 70 may include:

at least one processor 701, a memory 702, a receiver 703, a sender 704, and at least one communications bus 705 that is configured to implement a connection and mutual communication between the processor 701, the memory 702, and another module that is not shown.

The processor 701 may be a central processing unit (Central Processing Unit, CPU for short) or an application-specific integrated circuit (Application Specific Integrated Circuit, ASIC for short), or is configured as one or more integrated circuits that implement the embodiment of the present invention.

The memory 702 may include a read-only memory and a random access memory, and provides an instruction and data to the processor 701. A part of the memory 702 may further include a non-volatile random access memory (NVRAM).

Generally, the receiver 703 and the sender 704 may be a transceiver antenna of the base station.

The communications bus 705 may be an Industry Standard Architecture (Industry Standard Architecture, ISA for short) bus, a peripheral component interconnect (Peripheral Component, PCI for short) bus, an Extended Industry Standard architecture (Extended Industry Standard Architecture, EISA for short) bus, or the like. The bus 705 may be categorized into an address bus, a data bus, a control bus, and the like. For ease of denotation, the bus is denoted by using only one bold line in FIG. 7. However, this does not indicate that there is only one bus or only one type of buses.

Specifically, the sender 704 is configured to send first request information to a second base station, so that the second base station establishes a radio bearer between the second base station and user equipment UE according to the first request information, where the radio bearer includes an SRB, or a DRB, or an SRB and a DRB.

The receiver 703 is configured to receive first response information sent by the second base station, where the first response information includes radio bearer establishment information that is used to indicate, to the first base station, a success or a failure to establish the radio bearer between the second base station and the user equipment UE.

The first request information includes indication information that instructs the second base station to establish the radio bearer between the second base station and the UE; or the first request information includes a type and/or a priority of the radio bear that the second base station is instructed to establish between the second base station and the UE; or the first request information includes a type and/or a priority of the radio bear that the second base station is instructed to establish between the second base station and the UE, and information about a configuration parameter of the radio bearer.

Further, the first request information may further include a GTP TEID and information about a transport layer address that are of a radio bearer between the first base station and the UE, which are used to instruct the second base station to return a GTP TEID and information about a transport layer address that are of the radio bearer between the second base station and the UE.

Correspondingly, the first response information may include the GTP TEID and the transport layer address that are of the radio bearer between the second base station and the UE.

Further, the sender 704 may be specifically configured to:

send a request message for establishing an interface between base stations to the second base station, where the request message for establishing an interface between base stations includes the first request information.

Correspondingly, the receiver 703 may be specifically configured to:

receive a response message for establishing an interface between base stations that is sent by the second base station, where the response message for establishing an interface between base stations includes the first response information.

Exemplarily, the request information for establishing an interface between base stations further includes physical resource configuration information of the first base station and a C-RNTI of the UE, where the physical resource configuration information of the first base station includes at least one or more of the following information: identification information of the first base station, a PCI of a PCell, ECGI information of the PCell, and a PCI and an ECGI of zero to multiple SCells.

Exemplarily, the response message for establishing an interface between base stations further includes physical resource configuration information of the second base station, or a C-RNTI allocated to the UE by the second base station, or physical resource configuration information of the second base station and a C-RNTI allocated to the UE by the second base station.

The physical resource configuration information of the second base station includes at least one or more of the following information: identification of the second base station, a PCI and ECGI information of one to multiple SCells, and PCI information of an SCell that is configured with a PUCCH.

Optionally, the sender 704 may be specifically configured to:

send configuration request information of the second base station to the second base station, where the configuration request information of the second base station includes the first request information.

Correspondingly, the receiver 703 may be specifically configured to:

receive a configuration response message of the second base station that is sent by the second base station, where the configuration response message of the second base station includes the first response information.

Exemplarily, the configuration request information of the second base station further includes one or more of the following information: physical resource configuration information of the second base station, E-RAB configuration information, and SRB configuration information.

Optionally, the first response information further includes RRC configuration information of the second base station.

Further, the sender 704 may be further configured to:

send a packet including an RRC message to the second base station by using a GTP transport bearer that is between the first base station and the second base station and associates a radio bearer with another radio bearer, so that the second base station transmits the packet including the RRC message to the UE by using a corresponding SRB or DRB according to the packet.

Optionally, the sender 704 may be further configured to:

send, to the second base station by using an SCTP transport bearer of an interface between base stations, second request information used for transmitting an RRC message, so that the second base station transmits the RRC message to the UE by using a corresponding SRB or DRB according to the second request information, where the second request information includes an information element of the RRC message.

The first base station 70 provided in this embodiment of the present invention sends first request information to a second base station, so that the second base station establishes a radio bearer between the second base station and user equipment UE according to the first request information, where the radio bearer includes a signaling radio bearer SRB, or a data radio bearer DRB, or an SRB and a DRB; the first base station 70 receives first response information sent by the second base station, where the first response information includes radio bearer establishment information that is used to indicate, to the first base station, a success or a failure to establish the radio bearer between the second base station and the user equipment UE; and the radio bearer between the second base station and the UE, a transport bearer that associates the radio bearer between the second base station and the UE with a radio bearer between the first base station and the UE, and association information of the transport bearer are established. Then, RRC information generated by the first base station can be forwarded by using the radio bearer between the second base station and the UE, which improves a mobility management function of a communications system and provides a mobility enhancement function, thereby overcoming deficiencies in the prior art that a communications system has a poor mobility management function, and mobility cannot be enhanced because an RRC message can be transmitted between a macro base station and UE only by using a radio bearer between the macro base station and the UE.

Embodiment 7

Figure 8:
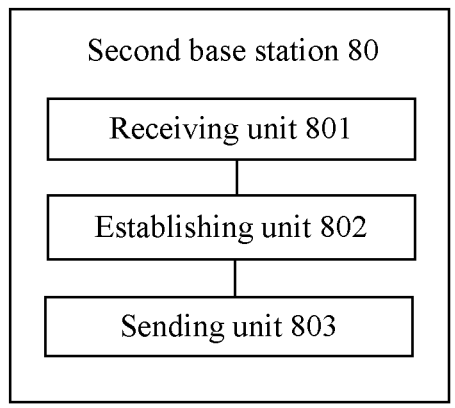
FIG. 8 is a schematic diagram of a structure of an apparatus of a second base station according to an embodiment of the present invention.

Embodiment 7 of the present invention provides a second base station 80. Referring to FIG. 8, the second base station 80 may include:

a receiving unit 801, configured to receive first request information sent by a first base station, where the first request information is used to instruct the second base station to establish a radio bearer between the second base station and user equipment UE, and the radio bearer includes an SRB, or a DRB, or an SRB and a DRB;

an establishing unit 802, configured to establish the radio bearer between the second base station and the user equipment UE according to an instruction of the first request information; and a sending unit 803, configured to send first response information to the first base station, where the first response information includes radio bearer establishment information that is used to indicate, to the first base station, a success or a failure to establish the radio bearer between the second base station and the user equipment UE.

Optionally, the first request information includes indication information that instructs the second base station to establish the radio bearer between the second base station and the UE; or the first request information includes a type and/or a priority of the radio bear that the second base station is instructed to establish between the second base station and the UE; or the first request information includes a type and/or a priority of the radio bear that the second base station is instructed to establish between the second base station and the UE, and information about a configuration parameter of the radio bearer.

Correspondingly, the establishing unit 802 may be specifically configured to:

establish the radio bearer between the second base station and the user equipment UE according to a pre-agreement and the indication information that instructs the second base station to establish the radio bearer between the second base station and the UE and is included in the first request information; or establish the radio bearer between the second base station and the user equipment UE according to the type and/or the priority, of the radio bearer that the second base station is instructed to establish between the second base station and the UE, included in the first request information; or establish the radio bearer between the second base station and the user equipment UE according to the type and/or the priority of the radio bearer that the second base station is instructed to establish between the second base station and the UE, and the information about the configuration parameter of the radio bearer that are included in the first request information.

Further, the first request information may further include a GTP TEID and information about a transport layer address that are of a radio bearer between the first base station and the UE, which are used to instruct the second base station to return a GTP TEID and information about a transport layer address that are of the radio bearer between the second base station and the UE.

Correspondingly, the first response message may include the GTP TEID and the transport layer address that are of the radio bearer between the second base station and the UE.

The receiving unit 801 may be further specifically configured to:

receive a request message for establishing an interface between base stations that is sent by the first base station, where the request message for establishing an interface between base stations includes the first request message.

Correspondingly, the sending unit 803 may be specifically configured to:

send a response message for establishing an interface between base stations to the first base station, where the response message for establishing an interface between base stations includes the first response information.

Exemplarily, the request message for establishing an interface between base stations may further include physical resource configuration information of the first base station and a C-RNTI of the UE, where the physical resource configuration information of the first base station includes at least one or more of the following information: identification information of the first base station, a PCI of a PCell, ECGI information of the PCell, and a PCI and an ECGI of zero to multiple SCells.

Exemplarily, the response message for establishing an interface between base stations may further include physical resource configuration information of the second base station, or a C-RNTI allocated to the UE by the second base station, or physical resource configuration information of the second base station and a C-RNTI allocated to the UE by the second base station.

The physical resource configuration information of the second base station includes at least one or more of the following information: identification of the second base station, a PCI and ECGI information of one to multiple SCells, and PCI information of an SCell that is configured with a PUCCH.

Optionally, the receiving unit 801 may be specifically configured to:

receive a configuration request message of the second base station that is sent by the first base station, where the configuration request message of the second base station includes the first request message.

Correspondingly, the sending unit 803 may be specifically configured to:

send a configuration response message of the second base station to the first base station, where the configuration response message of the second base station includes the first response information.

Exemplarily, the configuration request message of the second base station further includes one or more of the following information: physical resource configuration information of the second base station, E-RAB configuration information, and SRB configuration information.

Optionally, the first response information further includes RRC configuration information of the second base station.

The receiving unit 801 may be further configured to:

receive a packet that includes an RRC message and is sent by the first base station by using a GTP transport bearer that is between the first base station and the second base station and associates a radio bearer with another radio bearer.

Figure 9:
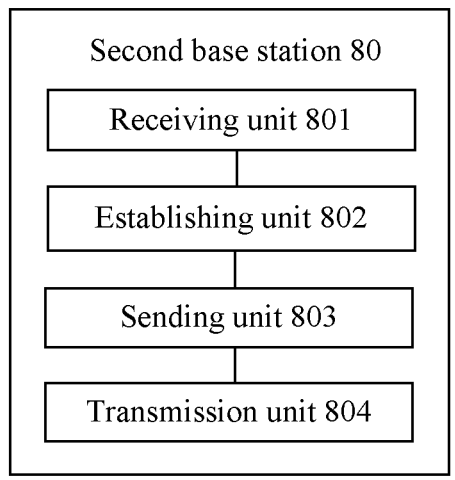
FIG. 9 is a schematic diagram of a structure of an apparatus of another second base station according to an embodiment of the present invention.

Further, referring to FIG. 9, the second base station 80 may further include: a transmission unit 804, configured to transmit the packet including the RRC message to the UE by using a corresponding SRB or DRB according to the packet.

Optionally, the receiving unit 801 may be specifically configured to:

receive second request information that is used for transmitting an RRC message and sent to the second base station by the first base station by using an SCTP transport bearer of an interface between base stations.

Optionally, the transmission unit 804 may be further configured to transmit the RRC message to the UE by using a corresponding SRB or DRB according to the second request information, where the second request information includes an information element of the RRC message.

The second base station 80 provided in this embodiment may be configured to execute actions of the second base station in the foregoing method Embodiment 2. For example, the receiving unit 801 may perform 301, the establishing unit 802 may perform 302, and the sending unit 803 may perform 303.

The second base station 80 provided in this embodiment of the present invention receives first request information sent by a first base station, where the first request information is used to instruct the second base station to establish a radio bearer between the second base station and user equipment UE, and the radio bearer includes an SRB, or a DRB, or an SRB and a DRB; the second base station 80 establishes the radio bearer between the second base station and the user equipment UE according to an instruction of the first request information; the second base station 80 sends first response information to the first base station, where the first response information includes radio bearer establishment information that is used to indicate, to the first base station, a success or a failure to establish the radio bearer between the second base station and the user equipment UE; and the radio bearer between the second base station and the UE, a transport bearer that associates the radio bearer between the second base station and the UE with a radio bearer between the first base station and the UE, and association information of the transport bearer are established. Then, RRC information generated by the first base station can be forwarded by using the radio bearer between the second base station and the UE, which improves a mobility management function of a communications system and provides a mobility enhancement function, thereby overcoming deficiencies in the prior art that a communications system has a poor mobility management function, and mobility cannot be enhanced because an RRC message can be transmitted between a macro base station and UE only by using a radio bearer between the macro base station and the UE.

Embodiment 8

Figure 10:
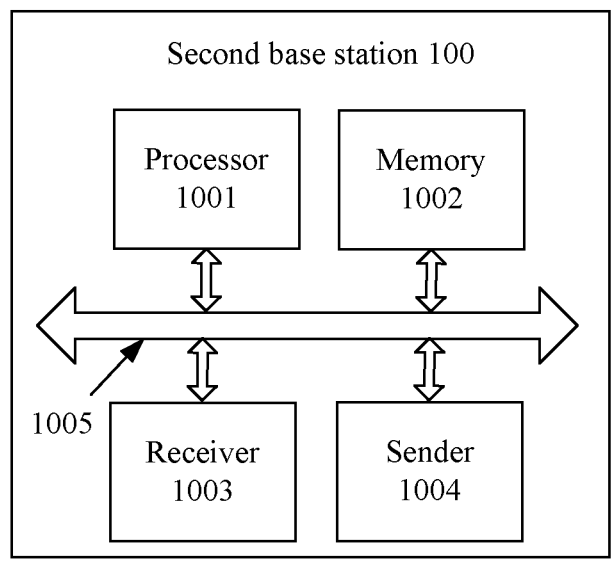
FIG. 10 is a schematic diagram of a structure of an apparatus of still another second base station according to an embodiment of the present invention.

Embodiment 8 of the present invention provides another second base station 100. Referring to FIG. 10, the second base station 100 may include:

at least one processor 1001, a memory 1002, a receiver 1003, a sender 1004, and at least one communications bus 1005 that is configured to implement a connection and mutual communication between the processor 1001, the memory 1002, and another module that is not shown.

The processor 1001 may be a central processing unit (Central Processing Unit, CPU for short) or an application-specific integrated circuit (Application Specific Integrated Circuit, ASIC for short), or is configured as one or more integrated circuits that implement the embodiment of the present invention.

The memory 1002 may include a read-only memory and a random access memory, and provides an instruction and data to the processor 1001. A part of the memory 1002 may further include a non-volatile random access memory (NVRAM).

Generally, the receiver 1003 and the sender 1004 may be a transceiver antenna of the base station.

The communications bus 1005 may be an Industry Standard Architecture (Industry Standard Architecture, ISA for short) bus, a peripheral component interconnect (Peripheral Component, PCI for short) bus, an Extended Industry Standard architecture (Extended Industry Standard Architecture, EISA for short) bus, or the like. The bus 1005 may be categorized into an address bus, a data bus, a control bus, and the like. For ease of denotation, the bus is denoted by using only one bold line in FIG. 10. However, this does not indicate that there is only one bus or only one type of buses.

Specifically, the receiver 1003 is configured to receive first request information sent by a first base station, where the first request information is used to instruct the second base station to establish a radio bearer between the second base station and user equipment UE, and the radio bearer includes an SRB, or a DRB, or an SRB and a DRB.

The processor 1001 is configured to establish the radio bearer between the second base station and the user equipment UE according to an instruction of the first request information.

The sender 1004 is configured to send first response information to the first base station, where the first response information includes radio bearer establishment information that is used to indicate, to the first base station, a success or a failure to establish the radio bearer between the second base station and the user equipment UE.

Optionally, the first request information includes indication information that instructs the second base station to establish the radio bearer between the second base station and the UE; or the first request information includes a type and/or a priority of the radio bear that the second base station is instructed to establish between the second base station and the UE; or the first request information includes a type and/or a priority of the radio bear that the second base station is instructed to establish between the second base station and the UE, and information about a configuration parameter of the radio bearer.

Correspondingly, the processor 1001 may be specifically configured to:

establish the radio bearer between the second base station and the user equipment UE according to a pre-agreement and the indication information that instructs the second base station to establish the radio bearer between the second base station and the UE and is included in the first request information; or establish the radio bearer between the second base station and the user equipment UE according to the type and/or the priority, of the radio bearer that the second base station is instructed to establish between the second base station and the UE, included in the first request information; or establish the radio bearer between the second base station and the user equipment UE according to the type and/or the priority of the radio bearer that the second base station is instructed to establish between the second base station and the UE, and the information about the configuration parameter of the radio bearer that are included in the first request information.

Further, the first request information may further include a GTP TEID and information about a transport layer address that are of a radio bearer between the first base station and the UE, which are used to instruct the second base station to return a GTP TEID and information about a transport layer address that are of the radio bearer between the second base station and the UE.

Correspondingly, the first response message may include the GTP TEID and the transport layer address that are of the radio bearer between the second base station and the UE.

The receiver 1003 may be further specifically configured to:

receive a request message for establishing an interface between base stations that is sent by the first base station, where the request message for establishing an interface between base stations includes the first request message.

Correspondingly, the sender 1004 may be specifically configured to:

send a response message for establishing an interface between base stations to the first base station, where the response message for establishing an interface between base stations includes the first response information.

Exemplarily, the request message for establishing an interface between base stations may further include physical resource configuration information of the first base station and a C-RNTI of the UE, where the physical resource configuration information of the first base station includes at least one or more of the following information: identification information of the first base station, a PCI of a PCell, ECGI information of the PCell, and a PCI and an ECGI of zero to multiple SCells.

Exemplarily, the response message for establishing an interface between base stations may further include physical resource configuration information of the second base station, or a C-RNTI allocated to the UE by the second base station, or physical resource configuration information of the second base station and a C-RNTI allocated to the UE by the second base station.

The physical resource configuration information of the second base station includes at least one or more of the following information: identification of the second base station, a PCI and ECGI information of one to multiple SCells, and PCI information of an SCell that is configured with a PUCCH.

Optionally, the receiver 1003 may be specifically configured to:

receive a configuration request message of the second base station that is sent by the first base station, where the configuration request message of the second base station includes the first request message.

Correspondingly, the sender 1004 may be specifically configured to:

send a configuration response message of the second base station to the first base station, where the configuration response message of the second base station includes the first response information.

Exemplarily, the configuration request message of the second base station further includes one or more of the following information: physical resource configuration information of the second base station, E-RAB configuration information, and SRB configuration information.

Optionally, the first response information further includes RRC configuration information of the second base station.

The receiver 1003 may be further configured to:

receive a packet that includes an RRC message and is sent by the first base station by using a GTP transport bearer that is between the first base station and the second base station and associates a radio bearer with another radio bearer.

Further, the processor 1001 may be further specifically configured to transmit the packet including the RRC message to the UE by using a corresponding SRB or DRB according to the packet.

Optionally, the receiver 1003 may be specifically configured to:

receive second request information that is used for transmitting an RRC message and sent to the second base station by the first base station by using an SCTP transport bearer of an interface between base stations.

Optionally, the processor 1001 may be further configured to transmit the RRC message to the UE by using a corresponding SRB or DRB according to the second request information, where the second request information includes an information element of the RRC message.

The another second base station 100 provided in this embodiment of the present invention receives first request information sent by a first base station, where the first request information is used to instruct the second base station to establish a radio bearer between the second base station and user equipment UE, and the radio bearer includes an SRB, or a DRB, or an SRB and a DRB; the second base station 100 establishes the radio bearer between the second base station and the user equipment UE according to an instruction of the first request information; the second base station 100 sends first response information to the first base station, where the first response information includes radio bearer establishment information that is used to indicate, to the first base station, a success or a failure to establish the radio bearer between the second base station and the user equipment UE; and the radio bearer between the second base station and the UE, a transport bearer that associates the radio bearer between the second base station and the UE with a radio bearer between the first base station and the UE, and association information of the transport bearer are established. Then, RRC information generated by the first base station can be forwarded by using the radio bearer between the second base station and the UE, which improves a mobility management function of a communications system and provides a mobility enhancement function, thereby overcoming deficiencies in the prior art that a communications system has a poor mobility management function, and mobility cannot be enhanced because an RRC message can be transmitted between a macro base station and UE only by using a radio bearer between the macro base station and the UE.

Embodiment 9

Figure 11:
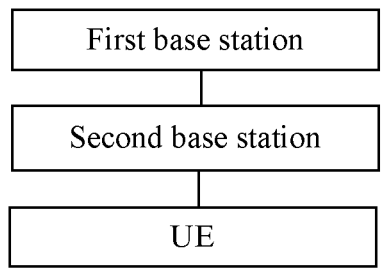
FIG. 11 is a system diagram of a communications system according to an embodiment of the present invention.

Embodiment 9 of the present invention provides a communications system. Referring to FIG. 11, the communications system may include:

the first base station described in anyone of the foregoing embodiments;

the second base station described in anyone of the foregoing embodiments; and the UE.

Because specific functions of the first base station and the second base station are described in the foregoing embodiments, details are not described herein again.

According to the communications system provided in this embodiment of the present invention, a first base station sends first request information to a second base station, so that the second base station establishes a radio bearer between the second base station and user equipment UE according to the first request information, where the radio bearer includes an SRB, or a DRB, or an SRB and a DRB; the first base station receives first response information sent by the second base station, where the first response information includes radio bearer establishment information that is used to indicate, to the first base station, a success or a failure to establish the radio bearer between the second base station and the user equipment UE; and the radio bearer between the second base station and the UE, a transport bearer that associates the radio bearer between the second base station and the UE with a radio bearer between the first base station and the UE, and association information of the transport bearer are established. Then, RRC information generated by the first base station can be forwarded by using the radio bearer between the second base station and the UE, which improves a mobility management function of the communications system and provides a mobility enhancement function, thereby overcoming deficiencies in the prior art that a communications system has a poor mobility management function, and mobility cannot be enhanced because an RRC message can be transmitted between a macro base station and UE only by using a radio bearer between the macro base station and the UE.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform some of the steps of the methods described in the embodiments of the present invention. The foregoing storage medium includes: any medium that can store program code, such as a USB flash drive, a removable hard disk, a read-only memory (Read-Only Memory, ROM for short), a random access memory (Random Access Memory, RAM for short), a magnetic disk, or an optical disc.

Finally, it should be noted that the foregoing embodiments are merely intended for describing the technical solutions of the present invention but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A method comprising:
    generating, by a master base station, a radio resource control (RRC) message;
    sending, by the master base station to a secondary base station, a first request to set up signaling radio bearers (SRB) 1 and SRB 2, wherein the first request excludes configuration of the SRB 1 and the SRB 2;
    receiving, by the master base station from the secondary base station, a configuration response, wherein the configuration response comprises: physical resource configuration information of the secondary base station to be forwarded to a terminal, and radio bearer establishment information to indicate to the master base station whether the SRB1 and the SRB2 have been set up by the secondary base station or not; and
    sending, after the SRB1 and the SRB2 have been set up by the secondary base station, by the master base station, using a stream control transmission protocol (SCTP), a second request to a secondary base station to trigger the secondary base station to transmit the RRC message to the terminal via the SRB 1 or the SRB 2 according to a SRB type, wherein the second request comprises the RRC message and the SRB type.

2. The method according to claim 1, wherein the first request is sent to the secondary base station to set up a data radio bearer (DRB).

3. The method according to claim 2, wherein the first request further comprises priority information which indicates a precedence level of the SRB1, the SRB2 and the DRB for the secondary base station to establish with the terminal.

4. A method comprising:
    receiving, by a secondary base station from a master base station, a first request to set up signaling radio bearers (SRB) 1 and SRB 2, wherein the first request excludes configuration of the SRB 1 and the SRB 2;
    sending, by the secondary base station, a configuration response to the master base station, wherein the configuration response comprises: physical resource configuration information of the secondary base station to be forwarded to a terminal, and radio bearer establishment information to indicate to the master base station whether the SRB1 and the SRB2 have been set up by the secondary base station or not;
    receiving, after the SRB1 and the SRB2 have been set up by the secondary base station, by a secondary base station using a stream control transmission protocol (SCTP), a second request from the master base station, the second request comprising a radio resource control (RRC) message and a SRB type; and transmitting, by the secondary base station, the RRC message to the terminal via the SRB 1 or the SRB 2 according to the received SRB type.

5. The method according to claim 4, wherein the first request is sent to the secondary base station to set up a data radio bearer (DRB).

6. The method according to claim 5, wherein the first request further comprises priority information which indicates a precedence level of the SRB1, the SRB2 and the DRB for the secondary base station to establish with the terminal.

7. An apparatus comprising:
a processor configured to generate a radio resource control (RRC) message; and
a transmitter configured to send a first request to set up signaling radio bearers (SRB) 1 and SRB 2 to a secondary base station, wherein the first request excludes configuration of the SRB 1 and the SRB 2; and
a receiver configured to receive a configuration response, wherein the configuration response comprises: physical resource configuration information of the secondary base station to be forwarded to a terminal, and radio bearer establishment information to indicate to the master base station whether the SRB1 and the SRB2 have been set up by the secondary base station or not;
wherein the transmitter is further configured to send, after the SRB1 and the SRB2 has been set up by the secondary base station, to the secondary base station by using a Stream Control Transmission Protocol (SCTP), a second request message to trigger the secondary base station to transmit the RRC message to the terminal via the SRB 1 or the SRB 2 according to a SRB type, and wherein the second request message comprises the RRC message and the SRB type.

8. The apparatus according to claim 7, wherein the first request is sent to the secondary base station to set up a data radio bearer (DRB).

9. The method according to claim 8, wherein the first request further comprises priority information which indicates a precedence level of the SRB1, the SRB2 and the DRB for the secondary base station to establish with the terminal.

10. An apparatus comprising:
a receiver configured to receive, from a master base station, a first request to set up signaling radio bearers (SRB) 1 and SRB 2, wherein the first request excludes configuration of the SRB 1 and the SRB 2; and
a transmitter configured to send a configuration response to the master base station, wherein the configuration response comprises: physical resource configuration information of the apparatus to be forwarded to a terminal, and radio bearer establishment information to indicate to the master base station whether the SRB1 and the SRB2 have been set up by the apparatus or not;
wherein the receiver further configured to receive, after the SRB1 and the SRB2 have been set up by the apparatus, from the master base station by using a Stream Control Transmission Protocol (SCTP), a second request message comprising a radio resource control (RRC) message and a SRB type; and
wherein the transmitter is further configured to transmit the RRC message to the terminal via the SRB 1 or the SRB 2 according to the received SRB type.

11. The apparatus according to claim 10, wherein the first request is sent to the apparatus to set up a data radio bearer (DRB).

12. The apparatus according to claim 11, wherein the first request further comprises priority information which indicates a precedence level of the SRB1, the SRB2 and the DRB for the apparatus to establish with the terminal.

* * * * *